(12) United States Patent
Petersen et al.

(10) Patent No.: US 11,009,359 B2
(45) Date of Patent: May 18, 2021

(54) TRANSPORTATION SYSTEMS AND RELATED METHODS

(71) Applicants: Todd Petersen, Chandler, AZ (US); John Ellis, Orland Park, IL (US)

(72) Inventors: Todd Petersen, Chandler, AZ (US); John Ellis, Orland Park, IL (US)

(73) Assignee: Lacuna Technologies Inc., Palo Alto, CA (US)

( * ) Notice: Subject to any disclaimer, the term of this patent is extended or adjusted under 35 U.S.C. 154(b) by 0 days.

(21) Appl. No.: 16/241,925

(22) Filed: Jan. 7, 2019

(65) Prior Publication Data

US 2019/0212159 A1    Jul. 11, 2019

Related U.S. Application Data

(60) Provisional application No. 62/675,101, filed on May 22, 2018, provisional application No. 62/619,350, filed on Jan. 19, 2018, provisional application No. 62/614,261, filed on Jan. 5, 2018.

(51) Int. Cl.

| | | |
|---|---|---|
| *G01C 21/34* | (2006.01) | |
| *G08G 5/00* | (2006.01) | |
| *G05D 1/02* | (2020.01) | |
| *G01C 21/36* | (2006.01) | |
| *G06Q 30/02* | (2012.01) | |

(52) U.S. Cl.
CPC ..... *G01C 21/3453* (2013.01); *G01C 21/3691* (2013.01); *G05D 1/0202* (2013.01); *G05D 1/0214* (2013.01); *G05D 1/0278* (2013.01); *G06Q 30/0283* (2013.01)

(58) Field of Classification Search
CPC . G01C 21/34; G08G 5/00; G06K 9/00; G05D 1/02; G05D 1/00; B60W 50/10
See application file for complete search history.

(56) References Cited

U.S. PATENT DOCUMENTS

| | | |
|---|---|---|
| 7,446,766 B2 | 11/2008 | Moravec |
| 7,912,583 B2 | 3/2011 | Gutmann et al. |
| 8,571,302 B2 | 10/2013 | Yoon et al. |
| 8,665,259 B2 | 3/2014 | McCrae et al. |
| 8,665,260 B2 | 3/2014 | McCrae et al. |
| 9,064,077 B2 | 6/2015 | Samadi et al. |
| 9,140,554 B2 | 9/2015 | Jerauld |
| 9,404,761 B2 | 8/2016 | Meuleau |
| 9,418,478 B2 | 8/2016 | Howard et al. |
| 9,459,622 B2 | 10/2016 | Abhyanker |
| 9,536,146 B2 | 1/2017 | Zheng et al. |

(Continued)

OTHER PUBLICATIONS

International Search Report/Written Opinion, PCT Patent Application No. PCT/US2019/012583, dated Mar. 25, 2019, 12 pages.

(Continued)

*Primary Examiner* — Yuri Kan
(74) *Attorney, Agent, or Firm* — Adam R. Stephenson, Ltd.

(57) ABSTRACT

Implementations of systems for controlling transportation spaces may include a routing module using a map of transportation spaces including a three-dimensional coordinate system of the transportation spaces, a planning module coupled to the routing module, a plurality of traffic sensors coupled with the routing module, and a pricing module coupled with the routing module.

20 Claims, 12 Drawing Sheets

(56) References Cited

U.S. PATENT DOCUMENTS

| | | |
|---|---|---|
| 9,594,381 B1 | 3/2017 | Clark et al. |
| 9,612,123 B1 | 4/2017 | Levinson et al. |
| 9,646,428 B1 | 5/2017 | Konrardy et al. |
| 9,671,791 B1 | 6/2017 | Paczan |
| 9,715,711 B1 | 7/2017 | Konrardy et al. |
| 9,754,325 B1 | 9/2017 | Konrardy et al. |
| 9,767,516 B1 | 9/2017 | Konrardy et al. |
| 9,773,418 B1* | 9/2017 | Smith .................. G08G 5/0043 |
| 9,805,423 B1 | 10/2017 | Konrardy et al. |
| 9,836,973 B2 | 12/2017 | Gordon et al. |
| 9,852,475 B1 | 12/2017 | Konrardy et al. |
| 9,858,621 B1 | 1/2018 | Konrardy et al. |
| 9,870,437 B2 | 1/2018 | Pope et al. |
| 9,910,441 B2 | 3/2018 | Levinson et al. |
| 9,939,284 B2 | 4/2018 | Meuleau |
| 9,963,106 B1 | 5/2018 | Ricci |
| 9,972,054 B1 | 5/2018 | Konrardy et al. |
| 9,984,572 B1 | 5/2018 | Newman |
| 2008/0154493 A1 | 6/2008 | Bitar et al. |
| 2013/0166188 A1 | 6/2013 | Zheng et al. |
| 2015/0016668 A1 | 1/2015 | Cheriyadat et al. |
| 2015/0127302 A1 | 5/2015 | Johnson |
| 2015/0346718 A1* | 12/2015 | Stenneth ............ G06Q 30/0611 |
| | | 701/2 |
| 2016/0104316 A1 | 4/2016 | Shenkar et al. |
| 2016/0117929 A1* | 4/2016 | Chan .................. G06Q 30/04 |
| | | 701/3 |
| 2016/0117931 A1* | 4/2016 | Chan .................. G08G 5/0043 |
| | | 701/120 |
| 2016/0117933 A1* | 4/2016 | Chan .................. G08G 5/0086 |
| | | 705/317 |
| 2016/0171316 A1* | 6/2016 | Fritsch ............... G06K 9/00791 |
| | | 382/104 |
| 2016/0209220 A1 | 7/2016 | Laetz |
| 2017/0003681 A1 | 1/2017 | Ross et al. |
| 2017/0123421 A1 | 5/2017 | Kentley et al. |
| 2017/0124658 A1 | 5/2017 | Gordon et al. |
| 2017/0162060 A1 | 6/2017 | Boland et al. |
| 2017/0192437 A1* | 7/2017 | Bier .................... G05D 1/0038 |
| 2017/0248963 A1 | 8/2017 | Levinson et al. |
| 2017/0372431 A1 | 12/2017 | Perl et al. |
| 2018/0068558 A1 | 3/2018 | Gordon et al. |
| 2018/0075538 A1 | 3/2018 | Konrardy et al. |
| 2018/0101782 A1 | 4/2018 | Gohl et al. |
| 2018/0106654 A1 | 4/2018 | Kim et al. |
| 2018/0129204 A1 | 5/2018 | Ricci et al. |
| 2018/0130347 A1 | 5/2018 | Ricci et al. |
| 2018/0131767 A1 | 5/2018 | Kozman et al. |
| 2018/0326997 A1* | 11/2018 | Sweeney ............. G01C 21/343 |
| 2019/0204838 A1* | 7/2019 | Hague .................... G01S 19/48 |

OTHER PUBLICATIONS

NACTO, Blueprint for Autonomous Urbanism, Designing Cities Edition, Module 1, Fall 2017, Part 1—30 Pages, Part 2—30 pages.

WHAT3WORDS LTD., RESTful API v2, Retrieved from the Internet: https://docs.what3words.com/api/v2/, Downloaded on Jan. 2, 2018, 28 pages.

project-osrm.org, OSRM API Documentation—General Options, Retrieved from the Internet: http://project-osrm.org/docs/v5.10.0/api#general-options, Downloaded on Jan. 3, 2018, 30 pages.

GOOGLE Developers, Place IDs, Google Places API, Retrieved from the Internet: https://developers.google.com/place/place-id, Downloaded on Jan. 4, 2018, 6 pages.

GOOGLE Developers, Google Maps Geocoding API—Getting Started, Retrieved from the Internet: https://developers.google.com/maps/documentation/geocoding/start, Downloaded on Jan. 4, 2018, 7 pages.

GOOGLE Developers, Google Places API Web Services—Place Details, Retrieved from the Internet: https://developers.google.com/places/web-service/details, Downloaded on Jan. 4, 2018, 13 pages.

City of Los Angeles—Department of Transportation, Dockless On-demand Personal Mobility Rules & Guidelines, v0.1, May 14, 2018, 12 pages.

GITHUB, INC., City of Los Angeles—Mobility Data Specification, v0.1, May 14, 2018, 12 pages.

* cited by examiner

TRANSPORTATION SYSTEMS AND RELATED METHODS

CROSS REFERENCE TO RELATED APPLICATIONS

This document claims the benefit of the filing date of U.S. Provisional Patent Application 62/614,261, entitled "Vehicle Control, Guidance, and Financial Management Systems and Related Methods" to Petersen which was filed on Jan. 5, 2018, U.S. Provisional Patent Application 62/619,350, entitled "Transportation space Regulation and Management Systems and Related Methods" to Petersen which was filed on Jan. 19, 2018, and U.S. Provisional Patent Application 62/675,101, entitled "Transportation Space Regulation and Management Systems and Related Methods" to Petersen which was filed on May 22, 2018, the disclosures of each of which are hereby incorporated entirely herein by reference.

BACKGROUND

1. Technical Field

Aspects of this document relate generally to transportation systems, such as air, land, or water transportation systems. More specific implementations involve the management of transportation systems utilizing autonomous vehicles.

2. Background

Transportation systems include systems of vehicles operated by individuals. Vehicles may include automobiles, trains, boats, and airplanes. The system may include rules, such as traffic laws and regulations, to manage the traffic system and traffic flow within the system.

SUMMARY

Implementations of systems for controlling transportation spaces may include a routing module using a map of transportation spaces including a three-dimensional coordinate system of the transportation spaces, a planning module coupled to the routing module, a plurality of traffic sensors coupled with the routing module, and a pricing module coupled with the routing module. The planning module may be configured to receive, through a telecommunication channel, a starting location and a destination location from an autonomous vehicle. The planning module may be configured to transmit, through a telecommunication channel, the starting location and the destination location to the routing module, the starting location corresponding to a first transportation space in the map and the destination location corresponding to a second transportation space in the map. The routing module may include a plurality of restrictions on the map. The plurality of traffic sensors may be configured to transmit, through a telecommunication channel, data associated with real time traffic to the pricing module and to the routing module. The routing module may be configured to generate, using the data associated with the real time traffic, the plurality of restrictions, the starting location, and the destination location, one or more routes to the destination location. The pricing module may be configured to calculate, using at least the data associated with the real time traffic, the current location, and the destination location, one or more prices for one or more routes to the destination location and transmit the one or more prices for the one or more routes, through a telecommunication channel, to the routing module. The routing module may be configured to transmit, through a telecommunication channel, the one or more prices for the one or more routes to the autonomous vehicle.

Implementations of systems for controlling transportation spaces may include one, all, or any of the following:

The system may include a governance module configured to transmit, through a telecommunication channel, to the routing module, the plurality of restrictions.

The map of transportation spaces may be divided into a set of three-dimensional spaces defined by either two or more triplets of alpha-numeric identifiers or a set of global positioning coordinates in combination with an altitude position value.

The one or more routes may include a lowest cost route, a fastest route, or a shortest route.

At least one traffic sensor of the plurality of traffic sensors may be included in the autonomous vehicle.

The system may include a movement module configured to track the movement of the autonomous vehicle.

The system may include a settlement module configured to receive movement data from the movement module. The settlement module may be configured to confirm actual movement of the autonomous vehicle with the one or more routes.

Implementations of systems for controlling transportation spaces may include a routing module including a map of a plurality of transportation spaces each in the form of a three-dimensional spatial block. Each of the plurality of transportation spaces may correspond with a physical area on the surface of the earth and an altitude position value. The plurality of transportation spaces may be associated with one or more rights of way. The system may include a planning module coupled to the routing module and a pricing module coupled with the routing module. The pricing module may be configured to receive input data. The planning module may be configured to receive, through a telecommunication channel, a starting location and a destination location from an autonomous vehicle. The routing module may be configured to generate one or more routes to the destination location. The pricing module may be configured to calculate one or more prices for each of the one or more routes to the destination location and transmit the one or more prices for the one or more routes, through the telecommunication channel, to the routing module. The pricing module may be configured to calculate one or more prices for each of the one or more routes to the destination location and transmit the one or more prices for the one or more routes, through the telecommunication channel, to the routing module.

Implementations of systems for controlling transportation spaces may include one, all, or any of the following:

The input data may include either a form of transportation data, real time traffic data, speed of transport data, weather data, or toll data.

The autonomous vehicle may be an aerial vehicle.

The system may be capable of handling a payment transaction for the one or more prices.

The plurality of transportation spaces may include curb space.

The transportation spaces may correspond to a set of three-dimensional spaces defined by either two or more triplets of alpha-numeric identifiers or a set of global positioning coordinates in combination with an altitude position value.

The system may include a settlement module configured to receive movement data from a movement module, wherein the settlement module is configured to confirm actual movement of the autonomous vehicle with the one or more routes.

Implementations of methods for controlling transportation spaces may include submitting, through a telecommunication channel, from a planning module, to a routing module, a trip request including a starting location and a destination location. The planning module may be configured to receive the trip request from an autonomous vehicle. The method may include generating, using the routing module, a map of transportation spaces. Each of the transportation spaces may be mapped in a three-dimensional coordinate system. The method may include transmitting, through a telecommunication channel, from a plurality of traffic sensors to the routing module and to a pricing module, data associated with real time traffic and generating, using the routing module, one or more routes to the destination location. The method may include calculating, using the pricing module, the data associated with real time traffic, the starting location, and the destination location, one or more prices corresponding with the one or more routes. The method may include transmitting, through the telecommunication channel, to the routing module, from the pricing module, the one or more prices corresponding to the one or more routes and transmitting, through the telecommunication channel, to a settlement module, from a movement module, the actual movement of the autonomous vehicle. The method may include verifying the actual movement of the autonomous vehicle with the one or more routes using a settlement module and handling a payment transaction for the one or more prices using the settlement module.

Implementations of methods may include one, all, or any of the following:

The map of transportation spaces may be divided into a set of three-dimensional spaces defined by either two or more triplets of alpha-numeric identifiers or a set of global positioning coordinates in combination with an altitude position value.

The one or more routes may include either a lowest cost route, a fastest route, or a shortest route.

At least one traffic sensor of the plurality of traffic sensors may be included in the autonomous vehicle.

The method may include receiving one or more restrictions at the routing module from a governance module.

The autonomous vehicle may be an aerial vehicle.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
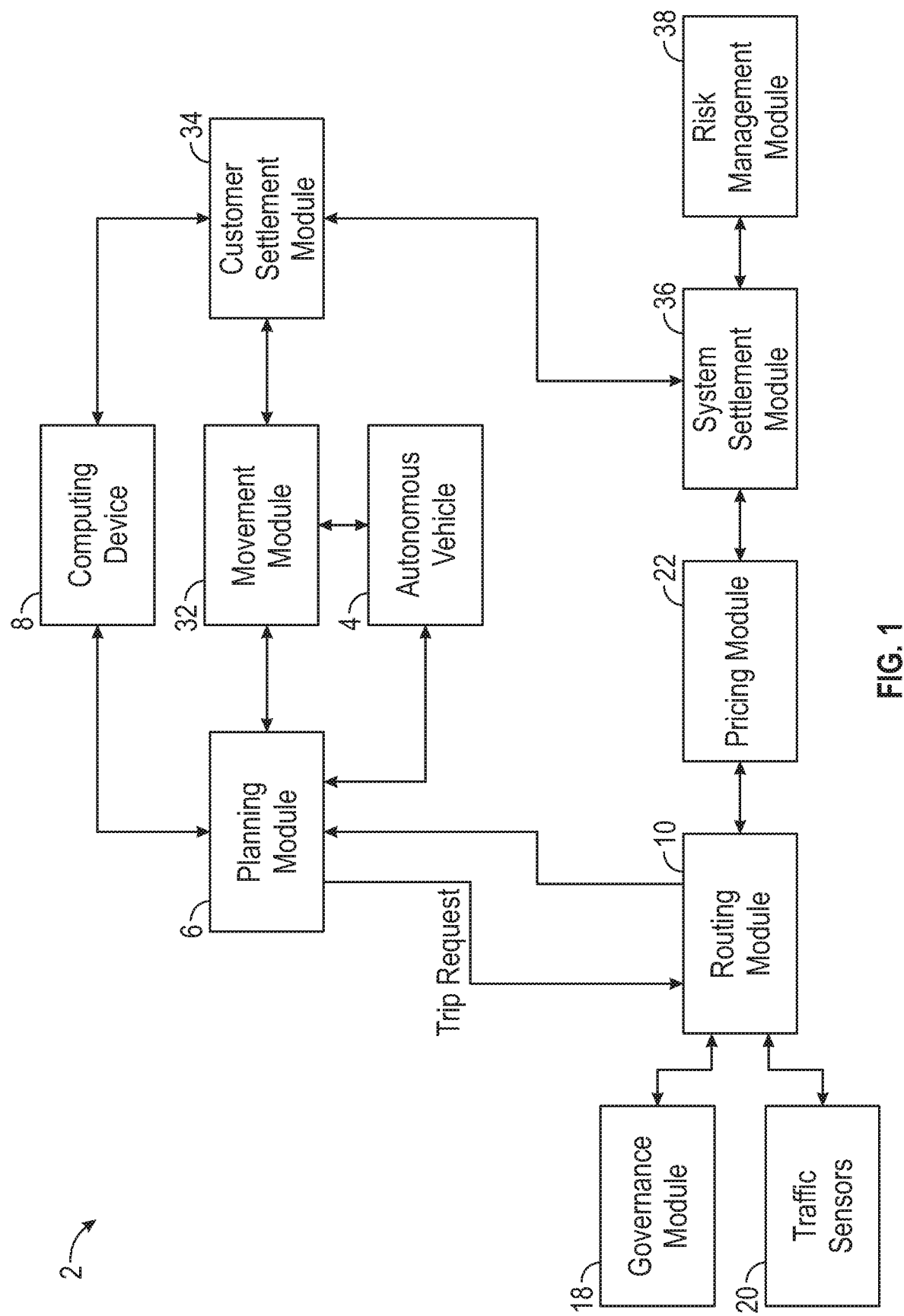
FIG. 1 is a block diagram of an implementation of a system for controlling transportation spaces.

This disclosure, its aspects and implementations, are not limited to the specific components, assembly procedures or method elements disclosed herein. Many additional components, assembly procedures and/or method elements known in the art consistent with the intended transportation systems and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such transportation systems and related methods, and implementing components and methods, consistent with the intended operation and methods.

Implementations of the transportation systems disclosed herein include transportation space regulation and management systems relating to systems and methods used to control and govern areas adjacent to and on/above/below public and private rights of way. Particular implementations also include roads, air spaces above roads, curb spaces, air spaces above curb spaces, bus stops, sidewalks, indoor spaces, such as, by non-limiting example, a mall or airport, surface water spaces and below surface water spaces, and any other space adjacent to, on, above, or below a public or private right of way.

Adjacent to or across a public or private right of away across a parcel of land, airway, or waterway is the area of the earth's surface referred to in this document as a "transportation space." As used herein, a "transportation space" includes, among other things, all of the ground surface, aerial, underwater, above water, or ground surface ingress and egress routes from a parcel of land into and out of the public or private right of way. In an urban environment, an example of a public right of way is a city street. Adjacent to the city street are the boundaries of the privately or other publicly held land parcels, and the owners/occupiers/licensees of those parcels use the public right of way to access the buildings on the parcels and the parcels themselves. The typical city street includes a pavement portion designed for vehicular transport and a sidewalk portion designed for pedestrian or select vehicle transport, separated by a curb portion. As used herein, a vehicle includes a system and/or device that is used or intended to be used to move a person or good from one physical location to another physical location. The entirety of the pavement, curb, and sidewalk portions typically may all be part of the physical dimensions of the public right of way, and in some areas are entirely owned in fee simple by the city or municipality. In other situations, portions or all of the right of way are not owned in fee simple, but are held by the city as easements on the parcels crossed by the city.

For the purposes of this document, exactly how legal title is held over the transportation space is not critical other than that the individual(s) or entity(ies) who own the rights have a legal ability to grant or deny access to the transportation space to members of the general public and commercial users (invitees and licensees).

In the implementations disclosed herein, various vehicles may be utilized with the transportation system including, by non-limiting example, autonomous, semi-autonomous, and manually controlled vehicles; aerial, land, and sea vehicles; drones; aircraft; automobiles trucks; boats; watercraft; ships; motorcycles; bicycles; and any other vehicle type. For autonomous and semiautonomous land vehicles, the vehicles may be controlled using any of a wide variety of navigation systems, including, by non-limiting example, camera-only based navigation systems, light detection and ranging (LIDAR)-based navigation systems, radar-based navigation systems, any combination of camera, LIDAR and/or radar-based navigation systems; and any other system or method of controlling a land, sea, air, or submersible vehicle.

Presently, land vehicle transportation takes place as drivers manually pilot automobiles and trucks along defined roadways, following rules established by governments and other controlling entities while following traffic signals and signs that are fixed in specific locations. While the ability for drivers to find out traffic information using applications on mobile devices exists, it is entirely up to the driver to find out this information and individually apply it. In the airspace, while the Federal Aviation Administration has regulations and air traffic control systems established (with some exceptions) for airspace over 500 feet above ground level, no current system or set of regulations beyond those regulating defined airspaces around airports or the general regulations controlling registration of unmanned aerial vehicles (UAVs) presently exists. Further, as autonomous and semiautonomous vehicles take to the roads in increasing numbers and testing pilots involving such vehicles continue, federal, state, and local governments face the challenge of how to adapt their policies and revenue streams to such vehicles. As autonomous vehicles are predicted to be predominately electric powered rather than gasoline powered, current revenue models relying on gas taxes to fund roadway maintenance and development activities will decline steadily while the number of vehicles on the road may remain about the same (or could increase, depending on the type of vehicle.) Also, governments currently have no system to monetize or regulate any of the airspace over the roadways they currently own.

Municipalities today have limited control over their respective transportation system's capacity and utilization. Many have Transportation Operations Centers (TOC) where banks of monitors are connected to a network of cameras used to monitor the system by personnel. This type of system offers operators a view into the system, which is useful for detecting exceptions (accidents, disabled vehicles) that ultimately contribute to congestion in the system. In addition, municipalities periodically re-time traffic controls at intersections. This is typically done by exception mostly through citizen feedback (complaints) or through periodic traffic studies at select locations. A few have the added ability to manage corridors through dynamically priced toll roads, but on the whole, the system in most cities is sub-optimal with high concentration of usage in some areas, while other areas have lower use.

The implementations of transportation systems and methods disclosed herein provide a unique system which allows control over a transportation system of autonomous, semi-autonomous, and even manual vehicles by municipalities, other governmental entities, or other organizations tasked with controlling rights of way. The systems disclosed herein allow the ability to regulate the transportation systems leading to increased efficiency. Finally, the systems and methods disclosed herein may enable/permit monetization transportation spaces with dynamic pricing for the entire system for autonomous, semi-autonomous, and manual vehicles.

Referring to FIG. 1, a block diagram of an implementation of a system for controlling transportation spaces is illustrated. In various implementations, a city, or other entity, may own and/or control the digital platform of the system. As illustrated, the system 2 operates through connecting with a customer who is in control of or seeks to control an autonomous vehicle 4 (either through ownership, rental, or through hailing an autonomous vehicle for use in transportation). The customer may be an individual person or an entity and the customer may own the autonomous vehicle 4, fractionally own the autonomous vehicle, rent the autonomous vehicle, or be licensed to use the autonomous vehicle. The autonomous vehicle 4 may be any disclosed in this document and traverse on any portion of the earth disclosed in this document. In various implementations, the system includes a planning module 6. The planning module 6 may be included in a web server. The planning module is configured to receive, through a telecommunication channel, a starting location and a destination location from the computing device 8. Through the computing device, the customer may submit a request to the planning module 6 to be routed to the desired destination location(s). As used herein, the telecommunication channel may include, by non-limiting example, a wired channel, a wireless channel, an optical channel, or an acoustic channel. In various implementations, the telecommunication channel may be the internet.

In various implementations, though not illustrated, the computing device 8 is in or attached to the autonomous vehicle 4 itself and the customer may interact with the device during operation of the autonomous vehicle 4. In these implementations, the computing device 8 may be, by non-limiting example, a part of the control system of the vehicle, part of the infotainment system of the vehicle, a device fixedly or removably coupled with the vehicle, or embedded in the vehicle itself. Thus, in such implementations, the planning module 6 is configured to receive the trip request, or the starting location and the destination location from the autonomous vehicle 4 via the device 8. In other implementations, the planning module 6 may be implemented using a portable computing device associated with the customer such as, by non-limiting example, a smart phone, a cell phone, a laptop, a tablet, a smart watch, or any other computing device that is movable by the user. In still other implementations, the planning module 6 may be implemented using a fixed or partly mobile computing device such as, by non-limiting example, a desktop computer, a server, a kiosk, an internet connected television or display, or any other computing device accessible to the user. The computing device 8 associated with or accessible by the user may, in various implementations, act as the planning module through being equipped to carry out the various planning method steps directly and communicate directly with the other modules of the system through a telecommunication channel.

In other implementations, the computing device 8 may merely exchange information with the planning module 6 over the telecommunication channel, not performing substantially any of the method steps implemented in the planning module. This may be done by communicating with the planning module 6 using simple message service (SMS) messaging, an internet browser, serial data communication, or other communication protocols, or via an application on the computing device that sends and receives information to the planning module 6 over the telecommunication channel. In these implementations, the operation of the planning module is carried out substantially using one or more cloud or distributed computing resources, such as, by non-limiting example, one or more servers, one or more databases, one or more web servers, one or more application servers, and any other cloud or distributed computing device all operatively coupled together.

In various implementations, in order to transmit a starting location to the planning module 6, the computing device 8 associated with the customer may include a global positioning system (GPS) receiver which has determined a GPS coordinate position of the customer and/or vehicle and optionally augmented by other dead reckoning methods familiar to those in the art. While GPS coordinates may be used, other forms of identifying the position of the customer may be employed, depending on the degree of precision desired, such as, by non-limiting example, the global coordinate system marketed under the tradename WHAT3WORDS by What3Words, Ltd. of London, United Kingdom; a postal code system; mapping and coordinate data marketed under the tradename GOOGLE MAPS by Google, Inc. of Mountain View, Calif.; the coordinate based system marketed under the tradename of GOOGLE PLACES by Google, Inc. of Mountain View, Calif.; the coordinate based system marketed under the tradename of PLACEID by Google, Inc. of Mountain View, Calif., any other coordinate or positioning determining system and any combination thereof. In system implementations utilizing PLACED, the PLACEID coordinate and position determining system may be implemented as disclosed in the provisional patent application previously incorporated entirely herein by reference. In various implementations, the GPS coordinate system may include an altitude position value in order to communicate the three-dimensional location of the customer and/or autonomous vehicle. In such implementations, any of the global coordinate systems disclosed herein may be modified to include the altitude position value using methods disclosed herein.

Where the PLACEID system is used, PLACEID is used to address locations on a GOOGLE® Map. The PLACEID itself is machine readable (not human friendly like a WHAT3WORDS address). Parametric information associated with the PLACEID is flexible including using the PLACEID to identify a square identified with NE, SW corner GPS coordinates. Similarly, systems similar to the PLACEID system may be used to identify a cube with three dimensional coordinates. Multiple PLACEID's can identify the same space, so PLACEIDS are not indexed on GPS like WHAT3WORDS; instead, the PLACED is the index.

While this document often refers to using the WHAT3WORDS coordinate system, any of the above coordinate systems may be used by using organic GPS decimal clippings to define square/cubic spaces. In system implementations involving land surface transport that employ the WHAT3WORDS coordinate system, the computing device may determine the corresponding WHAT3WORDS coordinate associated with the user or the planning module may determine the coordinate(s). The customer then enters in the desired destination(s) for the customer. In various implementations, the computing device may determine the corresponding WHAT3WORDS coordinate for the desired destination(s). In others, the planning module may determine the coordinate(s). The various system and method implementations disclosed herein may utilize any of the system and method implementations disclosed in the provisional patent applications previously incorporated herein.

Figure 2:
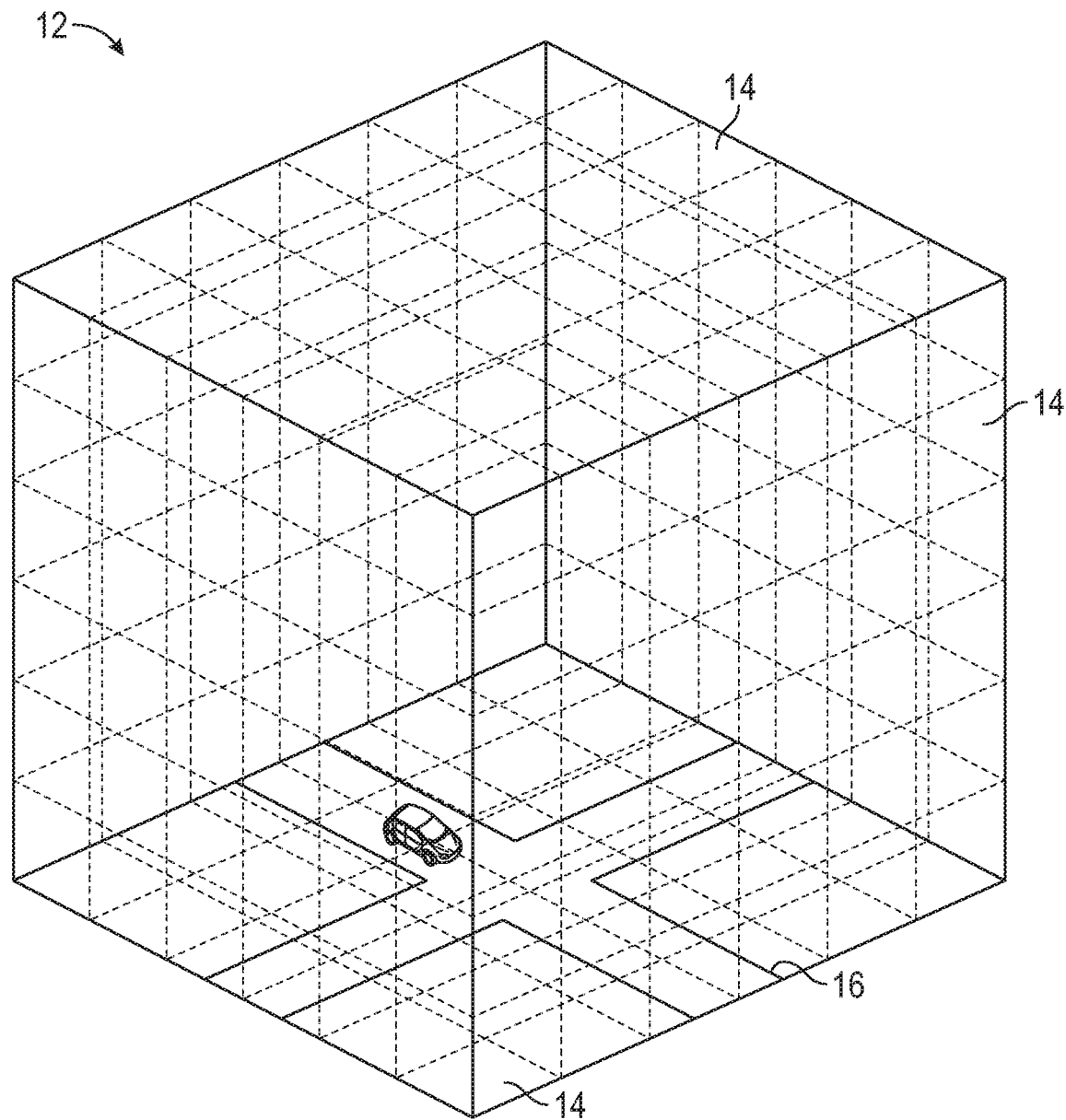
FIG. 2 is a perspective view of a three-dimensional map of transportation spaces.

As illustrated in FIG. 1, the system 2 includes a routing module 10 coupled with the planning module 6. In various implementations, the routing module may be a database server. The routing module 10 includes, and may be configured to generate, a map of transportation spaces. While the map of transportation spaces disclosed herein is often a three-dimensional map, it is understood that a two-dimensional map could also be used in systems controlling transportation only along the surface of the earth (as opposed to aerial or underwater transportation spaces). Referring to FIG. 2, a three-dimensional map of transportation spaces is illustrated. In various implementations, the map of transportation spaces 12 may be a three-dimensional map including a three-dimensional coordinate system of the transportation system. As illustrated, the map of transportation spaces 12 may be divided into a set of three-dimensional spaces 14, or spatial blocks. The three-dimensional spaces 14 may be defined by two or more triplets of alpha-numeric identifiers or a set of global positioning coordinates in combination with an altitude position value. Each of the plurality of transportation spaces in the set of transportation spaces corresponds with a physical area on the surface of the earth and with an altitude position value. The plurality of transportation spaces may be associated with one or more rights of way.

In various implementations, the routing module may be configured to receive a trip request, or the starting location and the destination location from the planning module (or autonomous vehicle). In such implementations, the trip request sent to the routing module 10, including the starting location and the destination location(s), may respectively correspond to a first space in the map and a second space in the map. The routing module 10 participates in the process of processing the trip request from the planning module 6 and determining the physical path(s) that the autonomous vehicle can traverse from its point of origin to its destination. In various system and method implementations, these processes may include, by non-limiting example, calculating a route along existing roadways, calculating a route through air space above roadways, publicly owned land and/or privately owned land, calculating a route to or over curb space, and/or calculating a route over and/or in a body of water publicly and/or privately owned. This may be done using any of the positioning systems/methods disclosed in this document (GPS, WHAT3WORDS, etc.). In various system implementations, the grid of 3 m by 3 m squares addressed using the three words in the WHAT3WORDS positioning system may be augmented to include an array of three dimensional airspace blocks/shapes that each have a ground facing perimeter the same size as the WHAT3WORDS block above which they rest, and a vertical distance reaching above the block. The vertical distance for a given 3D block may be from ground level up to the edge of the FAA regulated space (about 500 feet) in some implementations. In other implementations, the vertical distance for a given 3D block may be less than this and multiple 3D blocks may be stacked above one another over a given WHAT3WORDS block, each 3D block having the same or differing vertical distance from each other stacked 3D block. The 3D blocks may have vertical distances dynamically determined by the routing module 10 based on the type of autonomous air vehicle being used (for example, a large drone may be routed using larger/taller blocks than a small drone) or blocks of preset height which are already stored in a database coupled with the routing module 10 may be used.

The same principles may be employed for watercraft whether above the surface of the water or below the surface of the water, where water depth can be represented in the same way, except through a distance from the surface of the body of water. In various implementations, the heights of the blocks may be measured in mean sea level (MSL) measurements, above ground level (AGL) and/or Flight Level.

As illustrated in FIG. 2, in various implementations, the routing module 10 may use mapping data 16 from a provider like GOOGLE® and combine the map date with the coordinate system from WHAT3WORDS to form a set of WHAT3WORD blocks that correspond with the physical roadway or curb space—in other words, translate the coordinates of the physical roadway/curb space into a set or array of WHAT3WORD blocks that correspond with the physical location of the roadway/curb space. A similar principle can be carried out to map the 3D spatial blocks for airspace or the depth of a body of water. Translating the mapping data into sets of corresponding WHAT3WORD blocks may permit more accurate computation of a route by the routing module, movement module, autonomous vehicle, or any combination thereof.

Figure 9:
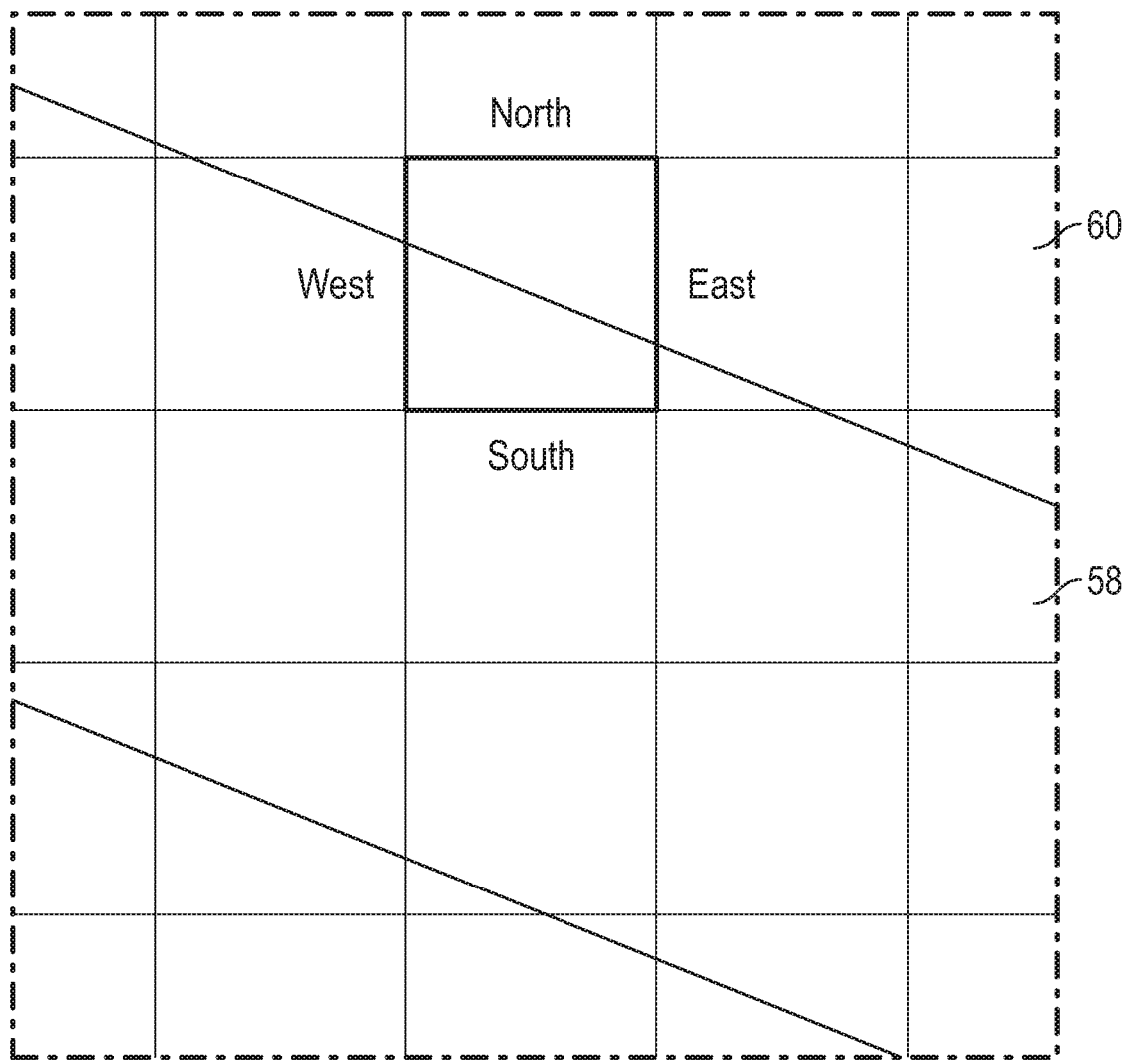
FIG. 9 is a magnified view of a map of transportation spaces.
Figure 10:
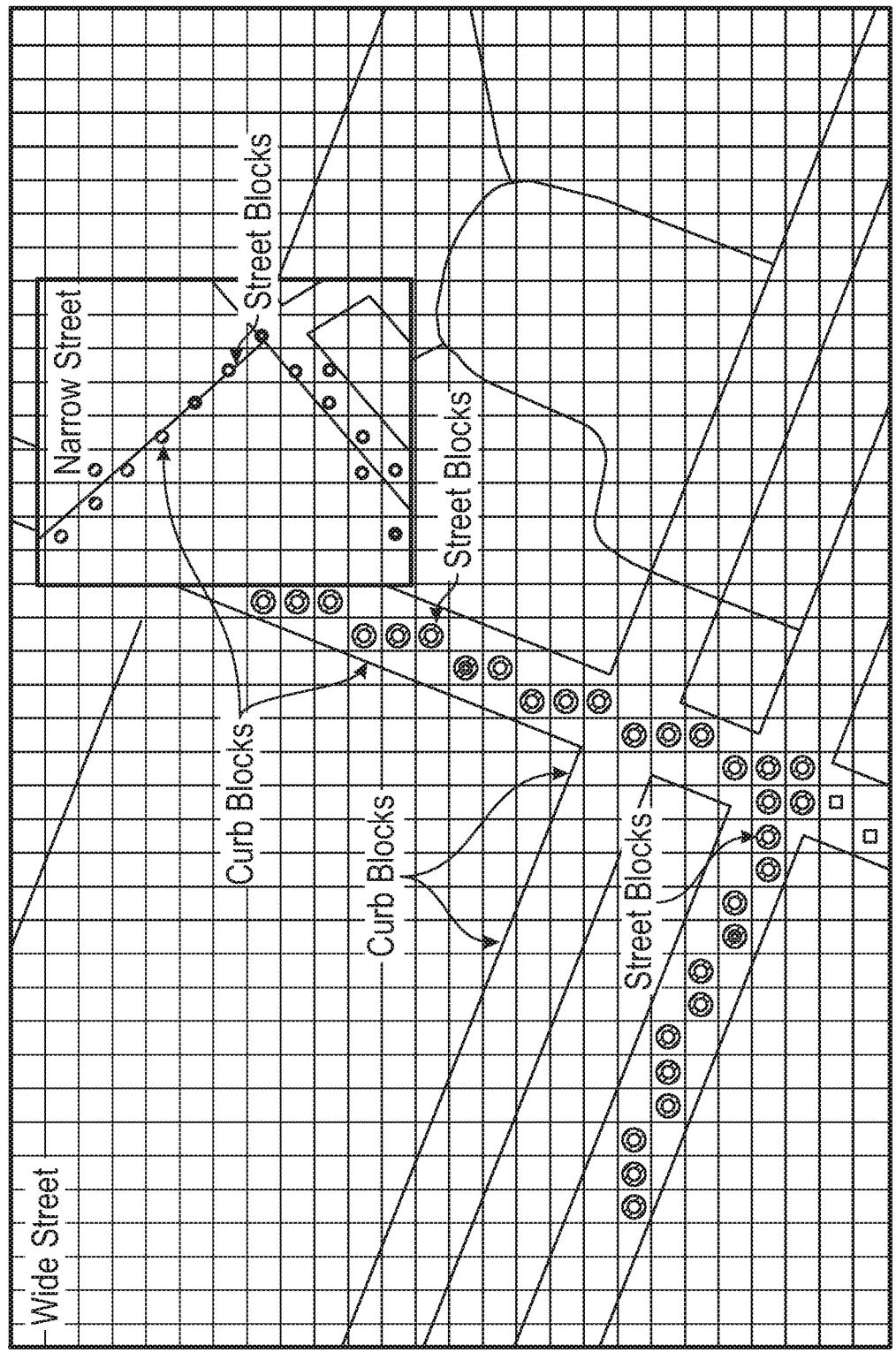
FIG. 10 is a view of a map of transportation spaces including narrow streets.

The routing module 10 may include a database storing the map of transportation spaces 12 which may include three dimensional aerial transportation spaces and/or underwater transportation spaces. The six edges that define the spatial block above or below each block may be used to define the transportation space or spatial block data and metadata associated with the plurality of transportation spaces in the database. Similarly, in various implementations, and as illustrated by FIGS. 9-10, each edge of a square for a transportation space of a two-dimensional map may be used to define transportation space data, such as curb space 60 and roadways 58. Where the roadway is narrow, both curbs may be located within the same square (see the Narrow Street example in FIG. 10). Where the roadway is slanted and wider, however, the single curb may cross multiple surfaces of the same square (as can be seen in FIGS. 9-10). In either case, additional information about what surface(s) of the block that the curb crosses or is located on allows the system to identify the specific geographic location of the curb portion. The use of metadata associated with each block to store this information about the curb portion for each spatial block may be how the system can, in various implementations, store a persistent model of the location(s) of the curb portion for each roadway in a transportation space.

In addition to metadata defining curb space, such metadata associated with the one or more spatial blocks may include data on the telecommunications network bandwidth available within each spatial block. Specifically, the metadata may include data on the bandwidths of various mobile carriers within a particular spatial block and how much average/median bandwidth is available from each carrier. The metadata may include municipality information or rules, such as, by non-limiting example, the color of a curb indicating parking permission or the length of permitted standing or idling time in a vehicle. The metadata may include infrastructure data, such as whether or not there is construction happening in a particular spatial block, whether the particular spatial block includes any kind of damage, such as damage to a sidewalk or roadway, or any other piece of data related to infrastructure. The metadata may also include toll data, speed of transport data, and information on natural conditions existing within the spatial block, such as present, past, or future weather conditions. In particular implementations, the metadata may include information on the amount of wind in the spatial block, whether there is fog, precipitation, or any other condition reducing visibility within the spatial block, and whether there are safety conditions existing within the spatial block (such as ice, snow, hail, etc.). The metadata may include data on restrictions within certain spatial blocks. Such restrictions may result from a dispute over who the proper owner of a spatial block of airspace is. Other restrictions may be placed because of unexplained vehicle losses (such as drone crashes) in a spatial block of airspace potentially caused by hostile activity toward the drone. Other restrictions may be set by system managers for any other reason. System managers may include private or public personnel. Example of such system managers may include, by non-limiting example, owners of private parking lots or buildings.

The metadata may include data on whether or not the particular spatial block is near or includes certain amenities, such as, by non-limiting example, a charging station, a fueling station, a repair station, restaurants, landing spaces, available parking spaces, various stores, or any other attraction. The metadata may also include information such as events, accidents, or heavy/light traffic. In other implementations, the metadata may include any other type of data. In various implementations, the metadata may be manually uploaded to the database. In other implementations, the metadata may be automatically uploaded to the database. The metadata may be uploaded to the database in real time, thus constantly reflecting a current condition of a particular spatial block. In other implementations, metadata representing general or common conditions of a spatial block may be cached before being uploaded (such as the spatial block generally experiencing strong wind, etc.). Such metadata may be used by any system disclosed herein. Such systems, and specifically the routing module of the systems, may take into account the metadata of the various spatial blocks when determining routes and other parameters of transportation. In particular implementations, the systems may also take into consideration information on/characteristics of the particular vehicle intended to be used in the transportation system. This information may be used in association with the metadata associated with the spatial blocks when planning the transport of particular vehicles. For example, a small drone may be restricted from certain airways based on metadata indicating strong winds within particular spatial blocks, however, a larger drone may not necessarily be restricted from the same airways based on the same metadata. In various implementations, the metadata may be transmitted to the routing module, through a telecommunication channel, from, by non-limiting example, computing devices, other modules, or sensors. Such sensors may include, by non-limiting example, weather sensors, temperature sensors, or image sensors.

Referring back to FIG. 1, the system 2 may include a governance module coupled with the routing module. The routing module 10 may be configured to receive information (or additional metadata), which may include restrictions, from a governance module 18. The governance module may include a computing device (including any type of computing device previously disclosed herein) used by governance entities such as, by non-limiting example, cities, governments, or any other entity. The governance entities may be able to enter particular restrictions into the system by entering the restriction into the computing system of the governance module 18 which may then transmit, through a telecommunication channel, the restriction to the routing module 10. Such restrictions may include, by non-limiting example, special events (such as a concert, sporting event, parade, funeral procession, or any other event which could have an effect on transportation), emergency situations, construction, or any other type of situation where a restriction on traffic may be desired. An example of the method of a government entity (or other entity or individual having access) uploading a restriction is discussed later herein and is illustrated by FIGS. 11-16. The various restrictions may be also be stored in a restrictions database and accessed by the routing module 10.

The system 2 may include a plurality of traffic sensors 20 coupled with the routing module 10. In addition to restrictions from the governance entity, the system may also take into consideration real time traffic information which may be gathered from the plurality of traffic sensors 20. In various implementations, at least one traffic sensor of the plurality of traffic sensors 20 is included in the autonomous vehicle 4. Similarly, in systems having numerous autonomous vehicles, each autonomous vehicle may include one or more traffic sensors. In this manner, the routing module 10, and in turn the system 2, may receive real-time traffic data from a real-time location of each autonomous vehicle.

All of this metadata, in combination with the block data of the transportation spaces (such as curb portion, sidewalk portion, telephone wire positions, etc.) may be mapped using the particular mapping system and stored in a database (which may be part of the routing module 10). The routing module 10 may then use the stored mapping data in route planning. In various implementations, the routing module 10 may also give priority to select vehicles (such as emergency vehicles or vehicles that are part of a transportation as a service (TaaS) company). In various implementations, the TaaS companies may purchase prioritized routing/destinations for their vehicles.

The routing module 10 may generate one or more routes to the destination location transmitted to the routing module from the planning module. In generating the routes, the routing module 10 may use all of or a portion of the block data and metadata within the routing module (such as real time traffic data, any of the plurality of restriction, the starting location, and the destination location). The routing module may compute routes including, but not limited to, the lowest cost route, fastest route, shortest route, and a route that includes a guaranteed arrival time for the autonomous vehicle between the customer's current location and the desired destination(s). In various implementations, any engine previously disclosed in any provisional application previously incorporated by reference may be used by the routing module 10 to generate the one or more routes.

Still referring to FIG. 1, the system 2 includes a pricing module 22 coupled with the routing module 10. In various implementations, and as illustrated, the pricing module 22 may be separate from the routing module 10, however, in other implementations the pricing module may be included in the routing module. Once the sets of corresponding WHAT3WORD blocks/3D spatial blocks have been created for a transportation space, in various system implementations, the system will assign certain sets of spatial blocks to form corridors of blocks. By non-limiting example, a set of blocks may form a corridor that has a base price associated with each block which an autonomous or semiautonomous vehicle will be charged as it passes through the corridor of blocks. In various implementations, the same corridor of blocks may have a surge price associated with each block which adds an additional charge above the base price if the system determines, by non-limiting example, that the corridor of blocks is particularly crowded, being traveled during certain times of the day, in a particular geographic location (i.e., a high occupancy vehicle lane or not in a high occupancy vehicle lane), and any other method of determining a surge price or assessing the value of a geographic corridor of blocks. In various implementations, the pricing of routes may be set entirely or partially through legislation.

In various implementations, the spatial blocks may be correlated to real-life. As an example, a law enforcement officer may need to see spatial block data and/or metadata to view permissions of parked vehicles, including cars, drones, bikes, and any other vehicle disclosed herein. In other implementations, city officials may want to visualize spatial block data while recording "ground truth." In various implementations, augmented reality may be used through the use of a smart phone camera or other device to visualize spatial blocks and their corresponding data and metadata. In such implementations, the image from the camera along with the geo-referenced location is synced with the block orientation and rendered on a screen. The view may also include selected data and/or metadata corresponding with the blocks. This may allow a user to visualize the spatial blocks in three dimensions. Virtual reality and/or augmented reality goggles may be used by the various users to view the spatial blocks and their corresponding data and/or metadata.

Upon the routing module 10 generating the one or more routes, it may be configured to transmit the one or more routes to the pricing module 22 for pricing of each route. The pricing module, in various implementations, calculates an instantaneous and/or real-time price for each transportation space (including curb space) and/or corridor of blocks using, by non-limiting example, an artificial intelligence (AI) model, a set of time-invariant databased price values previously calculated for each transportation space or block, a set of time-variant database price values previously calculated, any combination thereof, or any other system or method for assessing/modeling/calculating the price of an individual transportation space or corridor of blocks.

The pricing module 22 may also, in various implementations, take into account/apply any of the fee types disclosed in this document that are associated with any individual spatial block and/or corridor of blocks. The pricing module 22 then returns the calculated cost of each of the one or more routes to routing model 10. In some system and method implementations, the routing module 10 takes the calculated cost of each possible corridor(s) of blocks and then determines the lowest cost route. Factors which may be considered other than the total cost of the route in determining actual route include, by non-limiting example, the total time calculated to be expended as the autonomous vehicle travels each of the possible corridor(s) of blocks (a lower time may actually justify a higher cost route); the location of resources and/or amenities for the customer and/or autonomous vehicle (charging station locations, restaurants, restrooms), direction of travel, lane of travel, whether the route includes geographic areas of a scenic or historical significance, what type of blocks are being crossed/used (hardscape, airspace, curb-space, etc.), prevailing weather conditions (higher cost route may be required if a drone has to pass through a thunderstorm using the lowest cost route, for example), the availability of landing pads or launching/maintenance facilities, any combination thereof, or any other factor bearing on the success, customer comfort, the autonomous vehicle, or the task to be completed by the autonomous vehicle. In various implementations, the routing module may consider all of these factors alone; in others, both the pricing module and the routing module or just the pricing module may consider all of the factors and calculate the desired route. In various implementations, the lowest cost route may have an expiration date after which the costs provided can no longer be guaranteed. In other implementations, the desired route may be referred to as a movement contract or movement plan and the set of all routes/contracts/plans may be used by the pricing module to influence usage and/or traffic patterns.

In various implementations, those granted access to the system may be given equitable access to the various assets (roadways, curb spaces, air spaces, etc.) through differential pricing. For example, when system utilization is high, prices will increase. Prices could also increase based on other factors such as priority (first responders, police) or allow for-profit transportation companies to purchase faster routes or a guaranteed arrival time. The price of an asset could be represented as a base price that may be set by legislative mechanisms (when appropriate) and a flex price that is adjusted based on key performance indicators like "System Efficiency", etc. These key performance indicators (KPI's) may be used along with any of the other factors disclosed in this document with an artificial intelligence engine like a neural network that is trained to adjust prices to achieve a particular outcome such as efficiency or throughput. In some implementations, the pricing engine will run asynchronous to any movements in various implementations, allowing for the calculation of routes but also achieving objectives independent of any given route. The time that it takes to optimize the outcome would be proportional to the frequency and speed that the algorithm is executed combined with the system load. In some implementations, how fast the pricing engine runs may be adjusted based on the desired time constant of the control loop.

In other implementations, rather than the routing module 10 transmitting the one or more routes to the pricing module 22, the pricing module may calculate the cost of transport through the plurality of transportation spaces and may then send the cost of transport through the transportation spaces to the routing module. The routing module may then calculate the pricing of the one or more routes by matching the one or more routes with the pricing of travel through the corresponding plurality of transportation spaces. In such implementations, the block data and metadata, such as, by non-limiting example, the restrictions from the governance module 18 or the data from the plurality of traffic sensors 20, may be transmitted to the pricing module 22 through a telecommunication channel. The input data, including the block data and metadata, may be directly transmitted to the pricing module 22 or may be transmitted to the pricing module through the routing module 10. The input data may include a form of transportation data and/or any other type of data disclosed herein.

Upon the system calculating the one or more routes and the corresponding one or more prices, the routing module transmits the one or more routes and the one or more prices to the planning module over the telecommunication channel, and the planning module and autonomous vehicle may then work, along with the customer, to execute the desired route.

In other implementations, the one or more routes and the corresponding one or more prices may be transmitted, through a telecommunication channel, to the computing device and/or the autonomous vehicle operated by the user. In some implementations, it is the customer who ultimately decides the desired route they choose from the one or more routes provided by the system.

Figure 3:
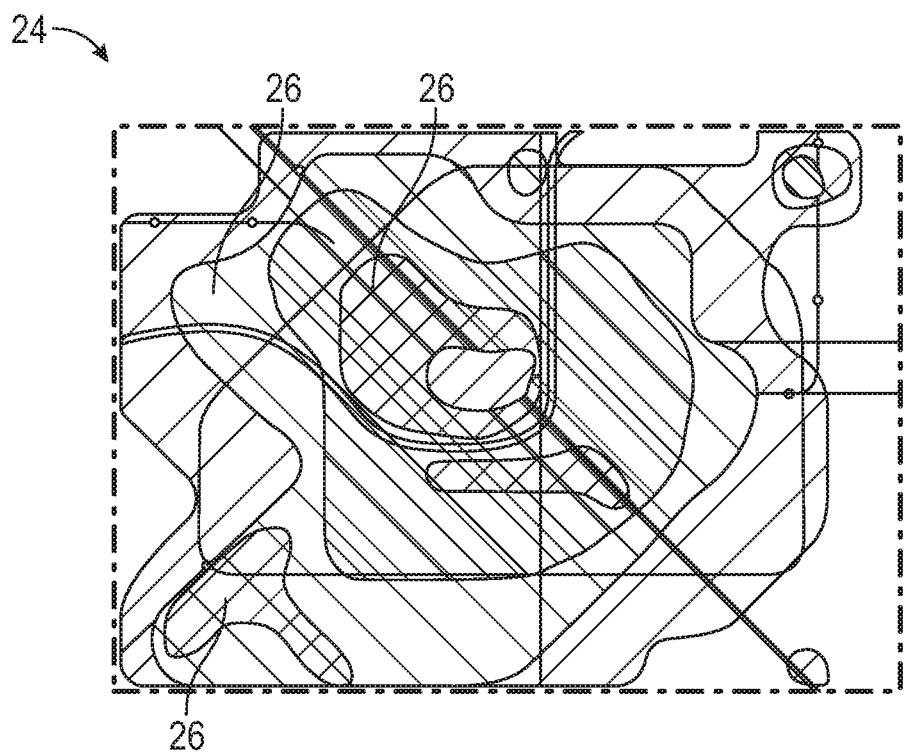
FIG. 3 is a view of a heat map showing different regions.
Figure 4:
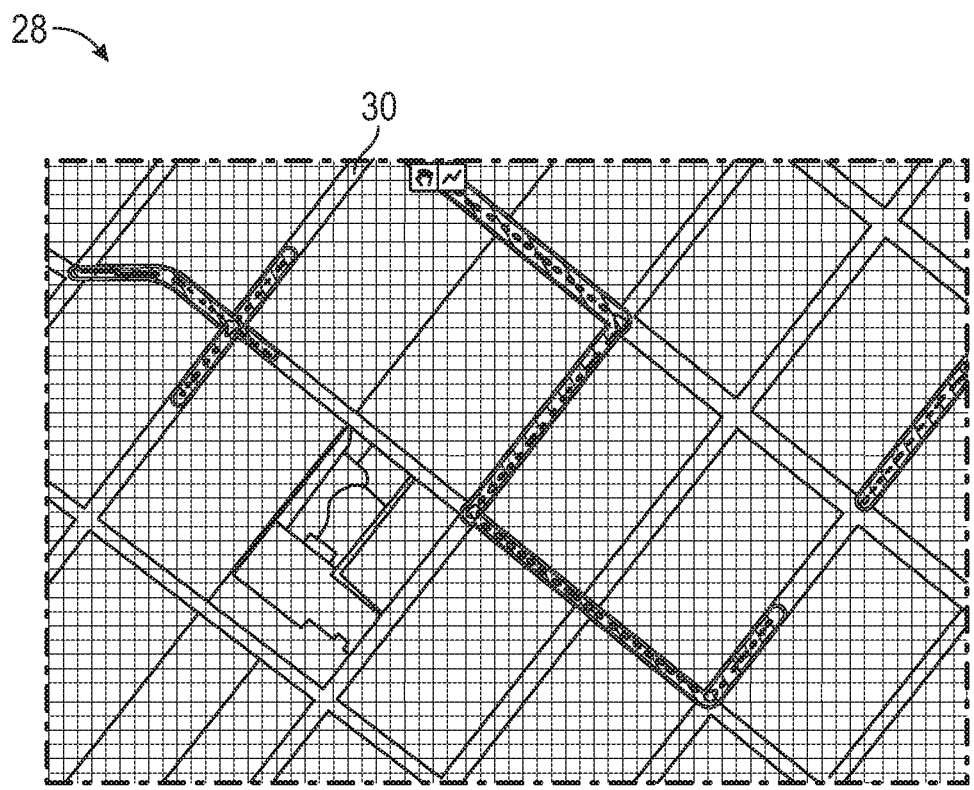
FIG. 4 is a view of a heat map showing different regions of congestion on a city street system.

Referring to FIG. 3, a view of a heat map showing different regions is illustrated. In various implementations, the routing module may be configured to transmit a map of the transportation spaces 24 (or at least a portion thereof) to the planning module or computing device or autonomous vehicle (or the governance module). The map 24 may be a heat map having various regions 26 indicating by non-limiting example, the price, availability, usage, mode of transportation, efficiency, or any other desired aspect of each transportation space in the map where each pixel in the heat map corresponds with a single transportation space. The heat map may be generated with any of the spatial block data and the metadata received by the routing module disclosed herein. In particular implementations, the heat map may be a bitmap, and each pixel in the bitmap corresponds with a transportation space. In various implementations, the bitmap may also be provided to various users of the systems disclosed in this document in its own user interface or included in one or more of the other interfaces disclosed in these documents. In particular implementations, particularly where the heat map covers a large number of transportation spaces (i.e., in a city-scaled map) the bitmap may be processed using compression techniques like those in the Joint Photographic Experts Group (jpeg) standard may be used to make the image zoomable and resizable while retaining as much of its original resolution as possible. These techniques would be implemented in the particular system interface being used by the user by the computing device associated with the user. FIG. 4 is an illustration of a heat map 28 which uses various patterns and/or colors of regions to show high and low traffic areas in a city street 30 system where the various pixels correspond with transportation spaces in the system.

Referring back to FIG. 1, the system 2 may include a movement module 32. In various implementations, the movement module 32 may be used to track/verify the path of the autonomous vehicle 4 along the desired route. This may be done by the movement module using a GPS module along with any dead reckoning algorithms and an onboard database of WHAT3WORDS coordinates/3D block coordinates) to "check off" each block as the autonomous vehicle passes through it. This tracking/verification process may also be done in various implementations by the system itself, either through the routing module, the computing device 8, the autonomous vehicle 10, or a customer settlement module 34 which independently tracks the position of the autonomous vehicle through use of a beacon or other active position/coordinate transmitting system coupled to the autonomous vehicle 4 itself or the computing device 8 associated with the customer or an object being carried by the autonomous vehicle 4 itself. In other implementations, no real-time tracking of the position of the autonomous vehicle may be transmitted, but the movement module 32 may transmit the actual spatial blocks traveled by the autonomous vehicle 4 when it has reached its destination(s). In these implementations, this tracking approach may be advantageous where the telecommunication channel is prone to interruption due to geographical features or weather conditions. Data from the movement module 32 can be transmitted to the planning module 6, customer settlement module 34, the autonomous vehicle 4 itself, and/or the computing device associated with the customer and then transmitted to the system settlement module 36 and/or routing module 10 during or after the trip using any of the foregoing module types. In some implementations, the movement module 32 may communicate changes to the route or adjustments to the route or may issue commands to the autonomous vehicle to correct its path if it deviates from the route. In some implementations, the movement module 32 is implemented in the autonomous vehicle 4 itself and/or in the computing device 8 traveling with the customer in the vehicle. In other implementations, the planning module 6 may be used to monitor the progress of the autonomous vehicle 4 along the route and perform the movement tracking and adjustment functions.

Still referring to FIG. 1, the system 2 includes a settlement module which includes a system settlement module 36 and a customer settlement module 34. Once the autonomous vehicle has reached the destination location(s), (this process can be carried out individually at each destination or collectively at the end of all the destinations on a multi-destination route), a customer settlement module 34 may be configured to receive the movement/trip data from the movement module 32, the computing device 8, and/or the autonomous vehicle 4, and then forward the data to a system settlement module 36 to handle the calculation and/or payment for the price of the trip. In some implementations, the trip price is paid in advance based on the calculated desired route. In such implementations, the customer settlement module 34 and system settlement module 36 work to reconcile the actual movement of the vehicle 4 to ensure that the actual movement corresponds with the prepaid price. In other system implementations, the trip price is paid after the trip is completed by the autonomous vehicle 4, using the desired route and the actual trip data. In others, particularly multi-destination routes, the customer settlement module 34 and system settlement module 36 work to reconcile and pay for each leg or portion of the trip as the vehicle is traveling. More specifically, the system settlement module 36 is designed to work with the customer settlement module 34 to, by non-limiting example, confirm payments, verify routes traveled, store data from autonomous vehicle for use in later modeling efforts by the routing module 10 and/or pricing module 6 and/or risk management module 38, receive payments, and forward any of the fees disclosed in this document to the appropriate third party, government entity, or government agency. In this way, the customer does not have to be involved or even aware of the specific fees charged by third parties or specific jurisdictions, but can simply focus on the trip and/or the task at hand. The use of the settlement module may allow the various third parties, government entities, and/or government agencies to monetize the property they own (whether land surface private or public land, airspace above private or public land, or the surface of depths of a private or publicly owned body of water).

The use of the settlement modules and/or the pricing module may also allow for regulation of air traffic/land vehicle traffic/water traffic/curb use through the use of charging different fees or through the routing module 10 knowing that only so many trips per day, by non-limiting example, may be conducted over or through a piece of private or public property. In this way, third parties and jurisdictions can use fees and modeling to help drive autonomous vehicle traffic to lower use areas and spread it out away from current high density traffic areas. This would allow municipalities and their Transportation Operations Centers to control traffic through pricing of roadways, airways, waterways, and/or curbs. Also, exceptions for special events and special corridors can be created and implemented using the system to prevent traffic from entering specific areas or reroute it over different routes to minimize congestion.

The fee charged to the autonomous vehicle for the trip may be presented to the customer as a single amount, but in various system and method implementations, the fee is actually a compound of a number of layers of fees levied by various entities and/or individuals. For the non-limiting purposes of this disclosure, the fee for a trip for a land-based autonomous vehicle (or semi-autonomous vehicle) may include any and any combination of the following: a right of way (roadway access fee) assessed by a city, county, state, and/or federal government; a rental fee for use of the autonomous vehicle (if the customer does not have title to the autonomous vehicle); a car payment fee (if the customer does have title to the autonomous vehicle, but pays for the cost of the vehicle partially or entirely through using the vehicle, as in a rent-to-own model), a risk recovery fee assessed by an insurance company or risk retention group (to be discussed in greater detail later), a system fee for use of the system for planning and reconciling the trip, an environmental impact fee assessed by a government entity and/or agency; a roadway maintenance fee assessed by a government entity and/or agency; a fuel fee (electric or fossil) if the vehicle's fuel is maintained by a third party or through the system; a vehicle maintenance fee assessed by the owner of the autonomous vehicle or a third party hired to maintain the autonomous vehicle, and any other fee assessed by a government entity, agency, third party, or the system implicated by or related to the trip taken and/or the autonomous vehicle.

The actual payment process may involve the use of cash (currency), credit card/electronic payments, or a blockchain currency (like that, by non-limiting example, marketed under the tradename BITCOIN or ETHEREUM, another presently existing blockchain currency, or a blockchain currency created specifically for the exclusive/nonexclusive use by the system, by non-limiting example). The use of blockchain in the payments process may reduce the overall cost of the trip by eliminating conventional credit card fees, foreign exchange costs for currency/coin, and allow the system to operate using a higher payments trust process than conventional payments processing, including cash. A wide variety of payment processes and/or systems may be employed to complete the payment either at the beginning, midstream, or at the end of the trip.

Still referring to FIG. 1, in various implementations the system 2 may include a risk management module 38. The risk management module 38 is used to calculate the various risk-related parameters and/or fees associated with, by non-limiting example, a specific trip, a particular kind of autonomous vehicle, the customer, the task, or any other variable or factor identified as having a bearing on risk cost recovery. Because when autonomous and semiautonomous vehicle are used, the fault for any accident is proportionally or entirely shifted away from the customer themselves (it is typically caused by a failure of the vehicle, a person driving a non-autonomous vehicle, or a failure of another autonomous/semiautonomous vehicle), insuring autonomous vehicles requires different actuarial models than manually operated vehicles. However, the settlement modules provide a rich source of data for the risk management module 38, allowing the risk management module to use the data to perform various actuarial calculations, such as, by non-limiting example, to determine the odds of an accident occurring, the cost of the accident, etc. The risk management module 38 then transmits this data to an insurance company and/or risk retention group for their use in calculating various risk-based fees and/or costs that can be assessed on a per trip basis or through a monthly or other fee paid by the customer, the owner of the autonomous/semiautonomous vehicle, or both. Artificial intelligence modeling may be employed by the risk management module in various implementations.

In various implementations, a method for controlling transportation spaces includes submitting a trip request, through a telecommunication channel, from a planning module to a routing module. The planning module may be any type of planning module disclosed herein and the routing module may be any type of routing module disclosed herein. The trip request may include at least a starting location and a destination location(s) and may be sent to the planning module from a computing device and/or a vehicle. The vehicle may be any type of vehicle disclosed herein.

The method for controlling transportation spaces includes generating, using the routing module, a map of transportation spaces with each of the transportation spaces mapped in a three-dimensional coordinate system. The map may be any type of map disclosed herein and the coordinate system may be any type of coordinate system disclosed herein. The map of transportation spaces may be three-dimensional in various implementations. In particular implementations, the map may be generated augmenting the grid of 3 m by 3 m squares in the WHAT3WORDS positioning system to include an array of three dimensional spatial blocks as previously disclosed herein.

The method may include transmitting through a telecommunication channel, from a plurality of traffic sensors, to the routing module, real-time traffic data. At least one of the traffic sensors may be included in the autonomous vehicle utilizing the system. The data may also be transmitted, either directly or indirectly, to a pricing module. In various implementations, the method may also include transmitting other information, such as restrictions from a governance module, to the routing module. The governance module and associated restriction may be any module type and restriction type disclosed herein. An example of how a governance entity may upload a restriction to a governance module is disclosed later herein in relation to FIGS. 11-16. Further, the method may include transmitting other spatial block data or metadata, such as weather conditions, to the routing module. The other spatial block data or metadata may include any type of data disclosed herein.

The method of controlling transportation spaces includes generating, using the routing module, one or more routes to the destination location. The routes may include any type of route previously disclosed herein. In various method implementations, this may include, by non-limiting example, calculating a route along existing roadways, calculating a route through air space above roadways, publicly owned land and/or privately owned land, calculating a route to or over curb space, and/or calculating a route over and/or in a body of water publicly and/or privately owned. This may be done using any of the positioning systems/methods disclosed in this document. The routing module may use any piece of spatial block data and/or metadata in generating the route. The method of controlling transportation spaces also includes calculating, using a pricing module, a price for each route generated. The pricing module may be any type of pricing module disclosed herein and may calculate the price based on any factors disclosed herein, such as the spatial block data and the metadata.

In various implementations, the method may include transmitting the one or more prices from the pricing module to the routing module. In other implementations, the method includes transmitting pricing information for all spatial blocks to the routing module and the routing module then correlating the routes with the appropriate prices. In still other implementations, the pricing module may be part of the routing module.

The method of controlling the transportation spaces may also include tracking movement of the autonomous vehicle using a movement module. The movement module may be any type disclosed herein. The method may include transmitting actual movement data from the movement module to a settlement module which may be any type of settlement module disclosed herein. The method may include verifying the actual movement of the autonomous vehicle with the possible routes using the settlement module. Because traffic is always changing, it is likely that a route may change while a vehicle is traveling to the destination location. By verifying the actual movement with the proposed route, the customer may be able to pay the proper amount for the transportation service. Such a method may, among other things, ensure that the customer pays the proper amount for the transportation service. The method of controlling transportation spaces may include handling the payment transaction for the price using the settlement module. In various implementations, the payment transaction may be handled using the settlement module. In this way, the customer does not have to be involved or even aware of the specific fees charged by third parties or specific jurisdictions as previously disclosed herein.

While the implementations disclosed herein primarily discuss the above method as occurring once during a single trip, in various method implementations at least portions thereof may be repeated or carried out multiple times during a single trip. As an example, if the vehicle needs to reroute due to traffic (such as congestion or an accident) or if the passenger needs to change the destination mid-route, various of the above process may repeat itself (pricing, routing, tracking, etc.). Changes to the trip may be taken into consideration by the pricing module and a single payment may be made. In other implementations, each time the vehicle reroutes may be considered a separate trip and separate payments may be made.

Figure 5:
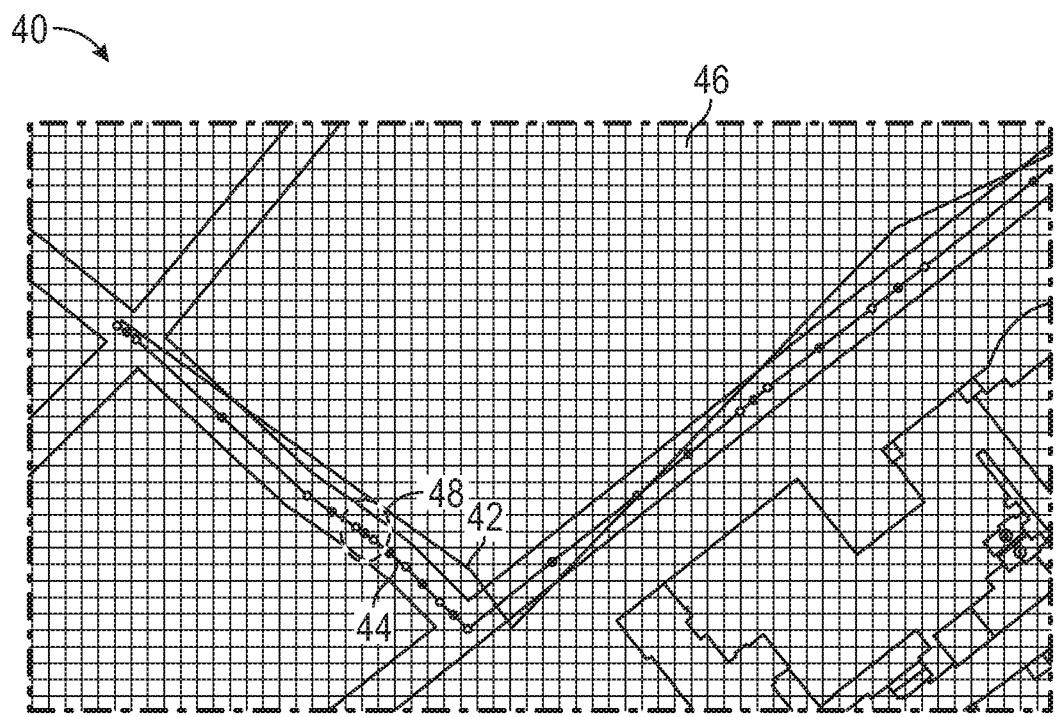
FIG. 5 is a view of a map of transportation spaces having a corrected route.
Figure 6:
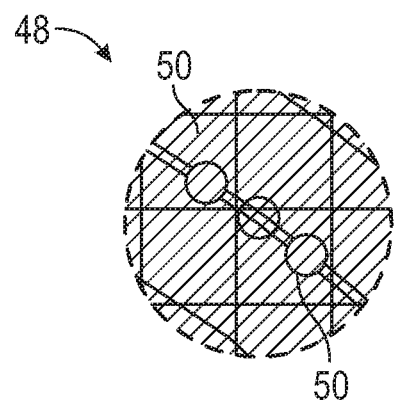
FIG. 6 is a magnified view of a portion of FIG. 5.
Figure 7:
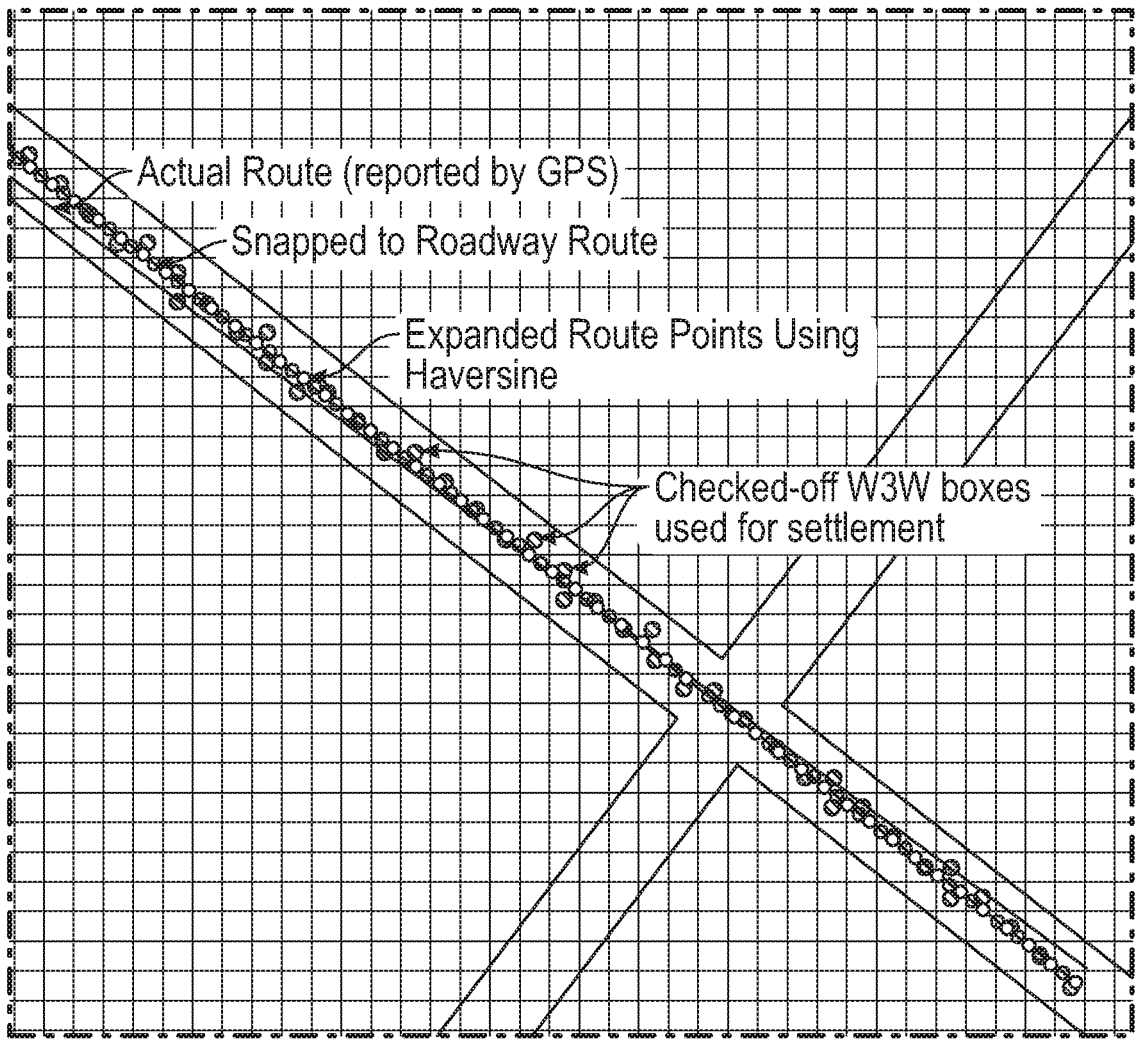
FIG. 7 is a view of a map of transportation spaces having checked off boxes indicating where a vehicle has traveled.

Various tools and methods may be employed in various movement modules, routing modules, pricing module, and settlement module implementations and corresponding method implementations. Some of these may involve use of and/or modification of data resources that currently exist or may be separately created and stored in databases associated with the system and accessed using the servers and webservers of the system. While many of the examples illustrated herein show use of two dimensional maps, it is understood that the same methods could be applied to three-dimensional mapping systems like those disclosed in this document. Referring to FIG. 5, a view of a map having a corrected route is illustrated. FIG. 5 is an example of the use of an application programming interface (API) marketed under the tradename SNAPTOROADWAY by Google. The map 40 shows that the position data 42 of the trip can be corrected by "snapping" it to a known roadway 44 or airway based on mapping data. The current version of the API marketed by Google is limited to 100 data points at a time, and so various implementations may include modifying the existing API to allow for more data points to be considered. An algorithm that extends the API to three-dimensional data to calculate the position of an aerial or underwater vehicle may also be employed. FIG. 5 also illustrates the 3 m by 3 m grid 46 for WHAT3WORDS superimposed over the Google map data. As illustrated, the use of data from GOOGLE® Maps may not return data points with sufficient granularity to resolve down to 3 m by 3 m squares so the use of geodesic vectors may be used. Using the Haversine formula to produce a rhumb line, the data from GOOGLE® Maps can be interpolated to generate an array of GPS coordinates at prescribed distance intervals, permitting the movement module, for example, to be able to check off each WHAT3WORDS box the autonomous vehicle has crossed, as illustrated in FIG. 7. Not all of the GOOGLE® Maps data may need to be interpolated, only that which is determined by the system to not provide the needed granularity. As an example, referring to FIGS. 5-6, section 48 of the map 40 includes enough data points as there are data points in consecutive transportation spaces 50.

GPS coordinates themselves have different degrees of resolution depending on the number of accurately determined decimal points associated with the measured coordinate. For example, the units digit (one decimal degree) gives a position up to 111 kilometers (60 nautical miles, about 69 miles). It can tell us roughly what large state or country the customer is in. The first decimal place is worth up to 11.1 km: it can distinguish the position of one large city from a neighboring large city. The second decimal place is worth up to 1.1 km: it can separate one village from the next. The third decimal place is worth up to 110 m: it can identify a large agricultural field or institutional campus. The fourth decimal place is worth up to 11 m: it can identify a parcel of land. It is comparable to the typical accuracy of an uncorrected GPS unit with no interference. The fifth decimal place is worth up to 1.1 m: it distinguishes trees from each other. Accuracy to this level with commercial GPS units can only be achieved with differential correction. The sixth decimal place is worth up to 0.11 m: which be used for laying out structures in detail, for designing landscapes, building roads. It is likely more than good enough for tracking movements of glaciers and rivers. This level of accuracy can be achieved by taking painstaking measures with GPS, such as differentially corrected GPS.

Figure 8:
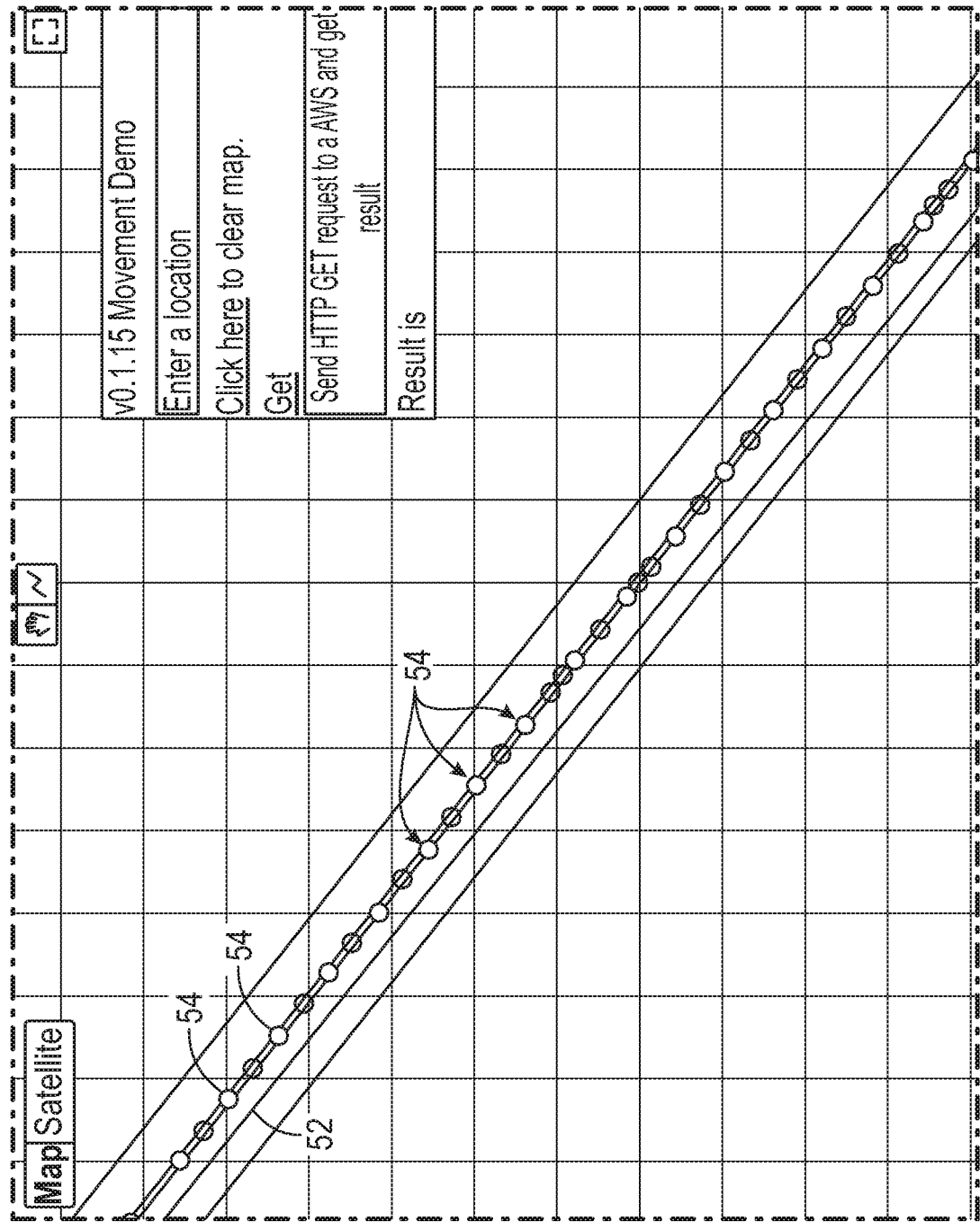
FIG. 8 is a view of a map of transportation spaces having raw GPS data.

An implementation of a method of doing interpolation and expanding the array of GPS data points to the needed granularity is illustrated in the processes described in FIG. 8. Referring to FIG. 8, a view of a map having raw GPS data is illustrated. FIG. 8 illustrates how the data points from Google Maps are plotted on a roadway and, while the vehicle is traveling, raw GPS data from the GPS receiver in the vehicle is collected. The Raw GPS data 52 is inputted into the SNAPTOROADWAY API and a set of data points 54 from Google Maps is generated. Data points from Google Maps have been observed to be "dirty"—in other words, they include points that overlap or are on top of each other. This type of data works fine for showing the customer the route on a map, but will not work for accurately calculating movement for a settlement. The set of data points 54 is then subsequently expanded to ensure that the data points properly cover the 3-meter WHAT3WORDS blocks. The data can be stored in a cloud database system such as that marketed under the tradename AMAZON WEB SERVICES by Amazon, Inc. of Seattle, Wash. in various implementations. In various implementations, the first step to expanding a data set is to calculate an array of trip distances to determine whether further processing is needed. The line between the points will be geodesic (curved with the earth) in case the parts are far enough apart to where they would be skewed into or out of a WHAT3WORDS block. The second step is to insert the calculated expanded array of points into the proper locations of array of data points from Google maps. The third step is to render the expanded array on the screen, and the fourth step is to persist or store the expanded array to a position/trip database storing the trip data. Pseudo code to perform these steps in Java language is below:

```
Pseudo Code:
For (i=0; sizeofarray-1; i++)
{
If (distance) == 0;
tossdatapoint = true;
If (distance) >= 2.9 meters
    ExpandedArray = ExpandArray(lat1[i], lng1[i], lat[i+1],
    lng[i+1]);
    // Insert the expanded array into Google Dataset
    OriginalArray.push(ExpandedArray( ), i, ExpandedArray, length)
}
```

In various implementations where the array of points returned by the API includes incorrect route points (i.e., the vehicle did not actually travel along the roads indicated), a dead-reckoning method combined with GPS using Kalman filtering may be employed to screen out these incorrect points in combination with the methods of expanding the data array so that the proper set of WHAT3WORDS/3D blocks can be calculated during or after the trip. the expanded array of points which currently are GPS coordinate positions is then converted into a corresponding set of WHAT3WORDS/3D blocks by inputting the array of points into an API provided by WHAT3WORDS and/or the system and converting the array of points into a set of WHAT3WORDS/3D block addresses. If the set of points has fine enough resolution, the risk of missing a particular block will be minimized. In various implementations, only those WHAT3WORDS/3D blocks that exist on the roadway are used to calculate pricing while all other blocks are ignored (such as those in parking lots, buildings, etc.). In other non-limiting implementations, WHAT3WORDS/3D block addresses may be grouped together to define a corridor. Usage of the corridor would be triggered by an autonomous vehicle's presence in single or multiple WHAT3WORDS blocks.

Referring to FIGS. 11-16, various graphical user interfaces (GUIs) are illustrated showing how a governance entity may enter a restriction on a transportation space, such as a curb space. While the figures and the associated discussion may focus heavily on managing curb space, it is understood that other transportation spaces, such as airways, waterways, harbors, and roadways, may be managed using the same or similar principals as those disclosed herein. In various implementations, a government entity, or other entity having access, may enter a restriction into the system, by logging into a private account. The account may be accessed through a web server. By logging in, the governance entity may have the ability to dynamically manage curb space and lane restrictions. The governance entity may be any entity previously disclosed herein.

Figure 11:
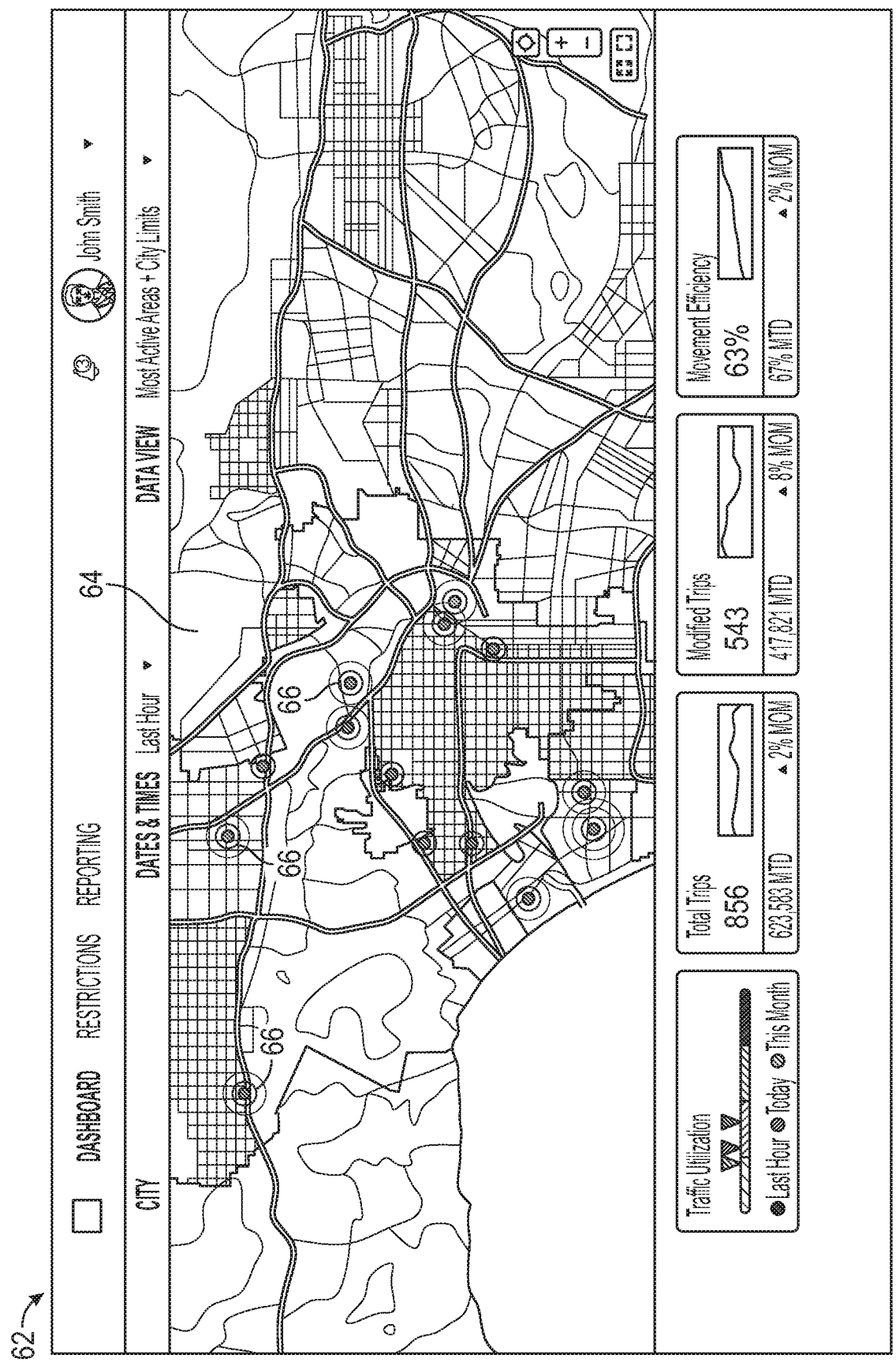
FIG. 11 is a view of a graphical-user-interface (GUI) representing a dashboard of the governance entity's account.

Referring to FIG. 11, a GUI representing a dashboard of the governance entities account is illustrated. The GUI 62 may include a dashboard including a map 64 corresponding with the governance entity. Once logged in, the governance entity may be able to view the map 64. The map 64 may be limited to the area over which the governance entity has jurisdiction. Thus, in implementations where the governance entity is a city, the governance entity may be able to view and place restrictions on the map of the city. As illustrated by FIG. 11, the map may include markers 66 (heat map markers) indicating where current restrictions have been placed, the most active areas of traffic, or any other type of indication. The GUI may also include a summary select information, such as traffic utilization, total trips, modified trips, movement efficiency, and/or any other piece of information.

Figure 12:
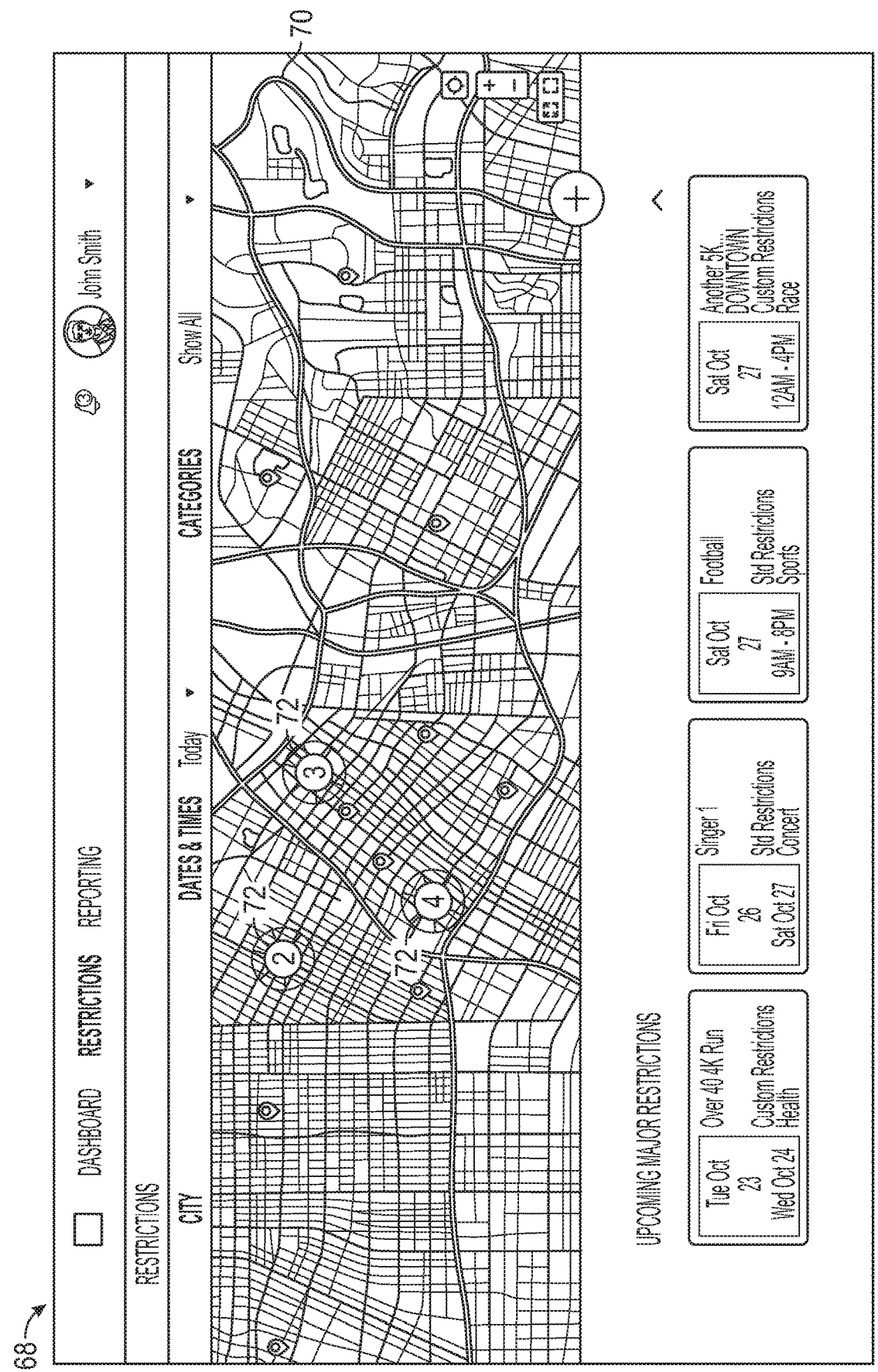
FIG. 12 is a view of a GUI illustrating restriction information for a transportation system.

Referring to FIG. 12, a GUI illustrating restriction information for a transportation system is illustrated. As illustrated, the GUI 68 may include a map 70 of all the past, current, and/or upcoming restrictions 72 in a particular area. A user may be able to filter the restrictions based on information such as a time, date, type of restriction, area, or any other type of information. The GUI may also include information on upcoming major restrictions. Though not illustrated, the GUI may also include information on upcoming restrictions, which may be viewed as a list or as tiles. The GUI may include an icon through which additional restrictions may be added.

Figure 13:
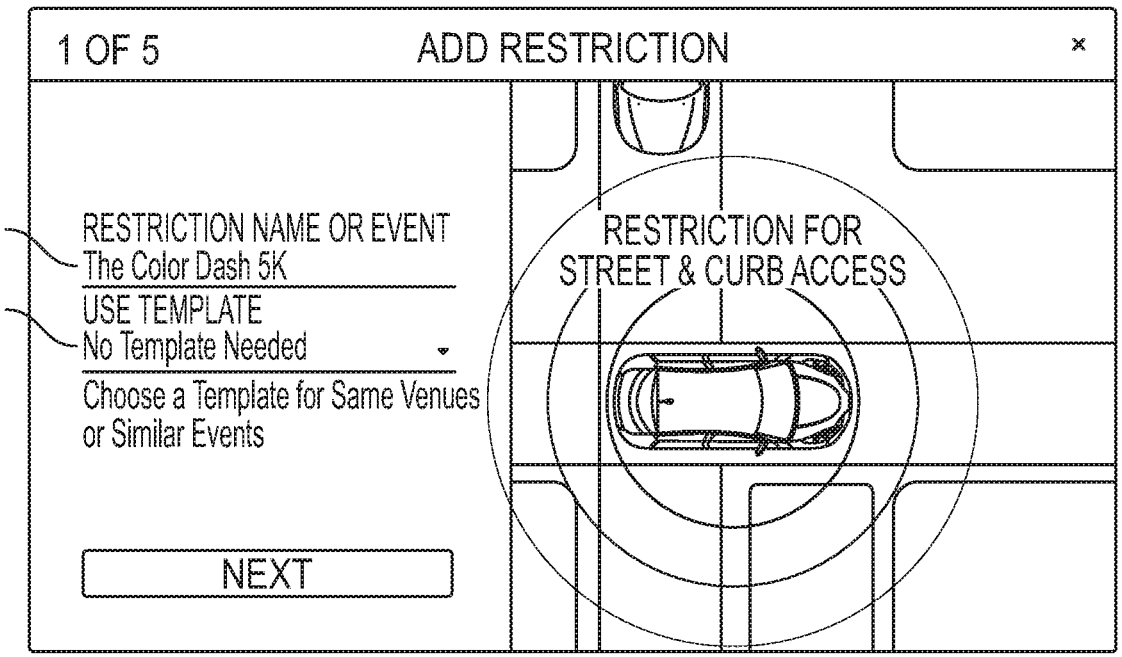
FIG. 13 is a view of a GUI representing the first step for adding a restriction for a transportation system upon clicking on the "+" icon of FIG. 12.

Referring to FIG. 13, a GUI representing the first step for adding a restriction for a transportation system upon clicking on the "+" icon of FIG. 12 is illustrated. The GUI 74 may include a field 76 to enter a name for the restriction. Further, the GUI 74 may include a field 78 where a previously saved template may be used for the new restriction.

Figure 14:
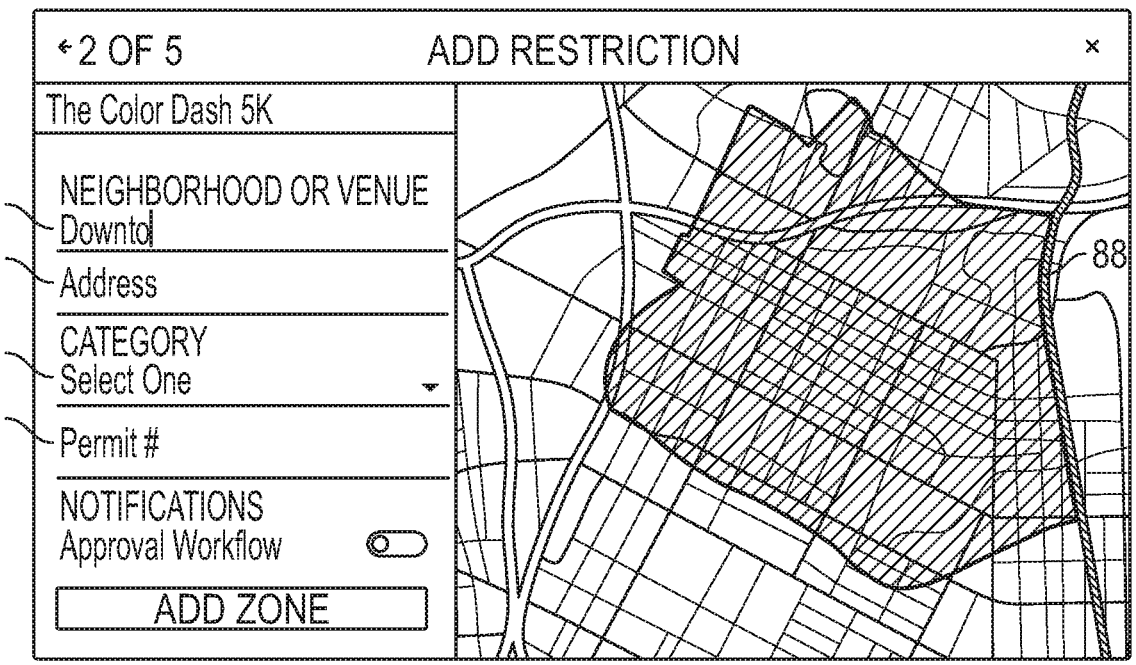
FIG. 14 is a view of a GUI representing the second step for adding a restriction for a transportation system.
Figure 15:
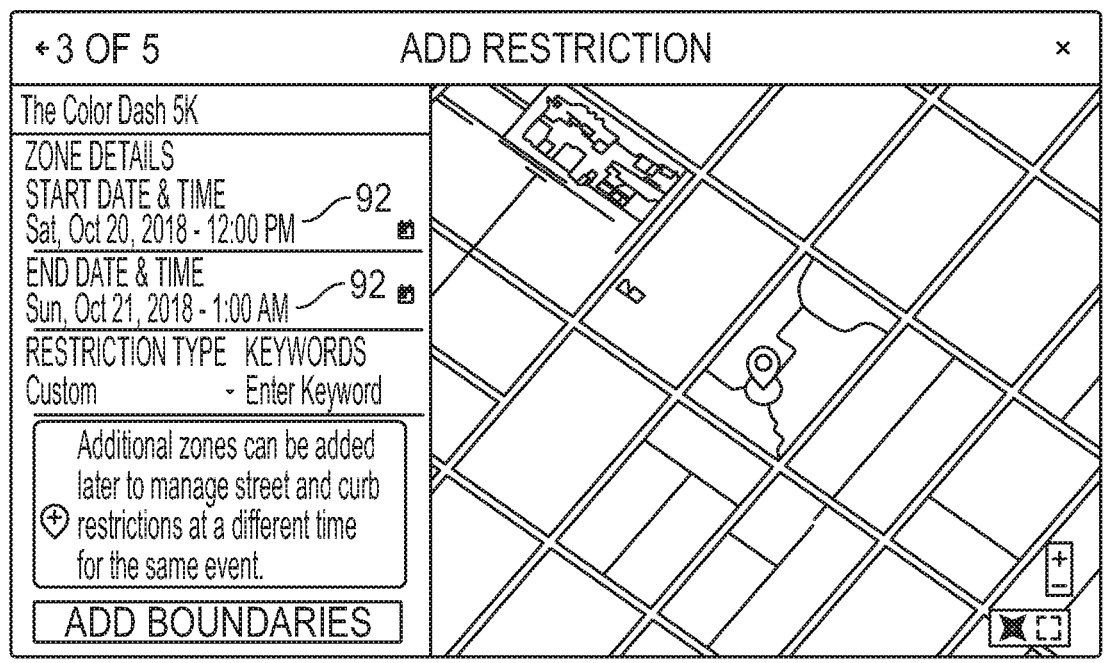
FIG. 15 is a view of a GUI representing the third step for adding a restriction for a transportation system.

Referring to FIG. 14, a GUI representing the second step for adding a restriction for a transportation system is illustrated. In various implementations, the GUI 78 may include a field 80 where the particular neighborhood or venue for the restriction can be added. The GUI 78 may also include a field 82 where the address of the restriction can be entered. A field 84 for entering a category for the restriction may also be allowed (temporary, permanent, event, emergency, etc.). Finally, a field 86 for entering the permit number of the restriction issued by a governmental or regulatory agency may be included. The GUI 78 may include a map 88 where the area of the restriction can be selected and/or displayed. Referring to FIG. 15, a GUI representing the third step for adding a restriction is illustrated. The GUI 90 may include fields 92 to enter in the Zone Details. The Zone Details may include the date and time of the restriction and/or the type of restriction. In various implementations, multiple zones can be added (for example a first zone covering the time before an event and a second zone covering the time after the event).

Figure 16:
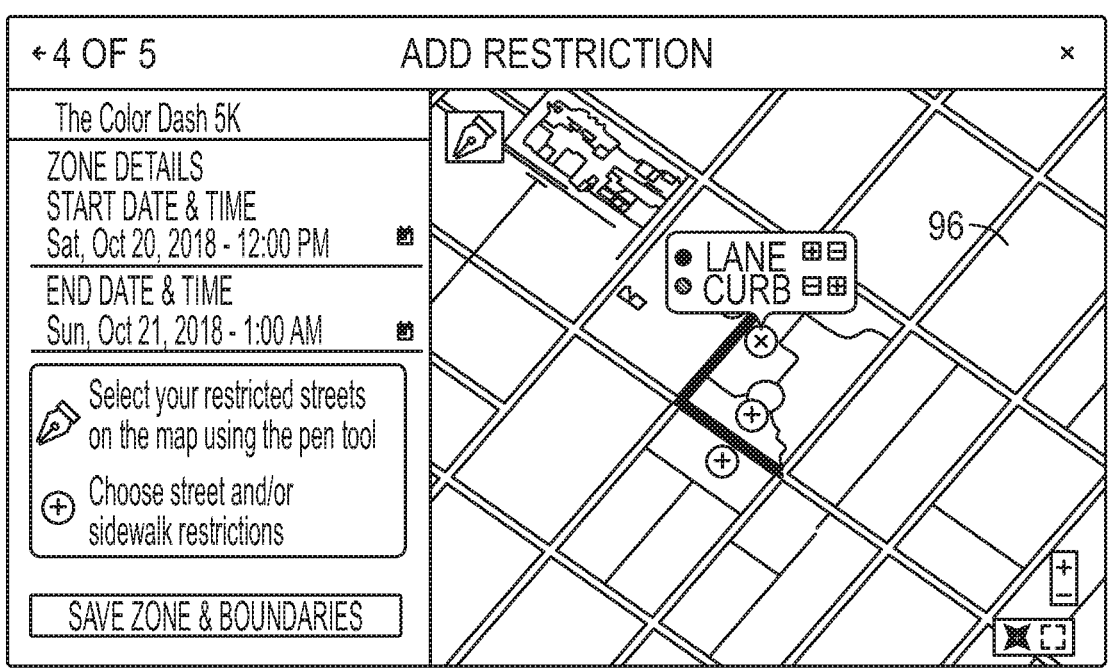
FIG. 16 is a view of a GUI representing a fourth step for adding a restriction for a transportation system.

Referring to FIG. 16, a GUI representing a fourth step for adding a restriction for a transportation system is illustrated. In various implementations, the GUI 94 may include a map 96 of the area of the restriction. A user may be allowed to select specific curbs, sidewalks, and/or lanes where they desire to put the restriction. The boundaries may vary widely depending on the type of restriction. As an example, the boundary for a marathon may cover miles of sidewalks, curbs, and/or roadways, whereas a boundary for a small concert may cover just the sidewalks, curbs, and/or lanes adjacent to the entry of the concert A fifth step for adding a restriction, though not illustrated, may include reviewing the restriction information previously entered in steps 1-4. The fifth step may include a GUI which may include an icon where additional zones can be added. The GUI may also include an icon where the restriction may be saved as a template. This may be beneficial for restrictions at common areas, such as around a stadium where there are regular events.

In places where the description above refers to particular implementations of transportation systems and related methods and implementing components, sub-components, methods and sub-methods, it should be readily apparent that a number of modifications may be made without departing from the spirit thereof and that these implementations, implementing components, sub-components, methods and sub-methods may be applied to other transportation systems and related methods.

What is claimed is:

1. A system for controlling transportation spaces comprising:
   a routing module using a map of transportation spaces comprising a three-dimensional coordinate system of the transportation spaces;
   a planning module coupled to the routing module;
   a plurality of traffic sensors coupled with the routing module; and
   a pricing module coupled with the routing module;
   wherein the planning module is configured to receive, through a telecommunication channel, a starting location and a destination location from an autonomous vehicle;
   wherein the planning module is configured to transmit, through the telecommunication channel, the starting location and the destination location to the routing module, the starting location corresponding to a first transportation space in the map of transportation spaces and the destination location corresponding to a second transportation space in the map of transportation spaces;
   wherein the routing module comprises a plurality of restrictions on the map of transportation spaces;
   wherein the plurality of traffic sensors are configured to transmit, through the telecommunication channel, data associated with real time traffic to the pricing module and to the routing module;
   wherein the routing module is configured to generate, using the data associated with the real time traffic, the plurality of restrictions, the starting location, and the destination location, one or more routes to the destination location;
   wherein the pricing module is configured to calculate, using at least the data associated with the real time traffic, a current location, and the destination location, one or more prices for transport through an area represented by a plurality of the transportation spaces corresponding to one or more routes to the destination location and transmit the one or more prices for the one or more routes, through the telecommunication channel, to the routing module; and
   wherein the routing module is configured to transmit, through the telecommunication channel, the one or more prices for the one or more routes to the autonomous vehicle.

2. The system of claim 1, further comprising a governance module configured to transmit, through the telecommunication channel, to the routing module, the plurality of restrictions.

3. The system of claim 1, wherein the map of transportation spaces is divided into a set of three-dimensional spaces defined by one of two or more triplets of alpha numeric identifiers or a set of global positioning coordinates in combination with an altitude position value.

4. The system of claim 1, wherein the one or more routes includes one of a lowest cost route, a fastest route, or a shortest route.

5. The system of claim 1, wherein at least one traffic sensor of the plurality of traffic sensors is comprised in the autonomous vehicle.

6. The system of claim 1, further comprising a movement module configured to track movement of the autonomous vehicle.

7. The system of claim 6, further comprising a settlement module configured to receive movement data from the movement module, wherein the settlement module is configured to confirm actual movement of the autonomous vehicle with the one or more routes.

8. A system for controlling transportation spaces comprising:
 a routing module comprising a map of a plurality of transportation spaces each in a form of a three-dimensional spatial block, each of the plurality of transportation spaces corresponding with a physical area on a surface of earth and an altitude position value, the plurality of transportation spaces associated with one or more rights of way;
 a planning module coupled to the routing module; and
 a pricing module coupled with the routing module, the pricing module configured to receive input data;
 wherein the planning module is configured to receive, through a telecommunication channel, a starting location and a destination location from an autonomous vehicle;
 wherein the planning module is configured to transmit, through the telecommunication channel, the starting location and the destination location to the routing module, the starting location corresponding with a first transportation space and the destination location corresponding with a second transportation space;
 wherein the routing module is configured to generate one or more routes to the destination location;
 wherein the pricing module is configured to calculate one or more prices for transport through an area corresponding with the plurality of the transportation spaces corresponding to each of the one or more routes to the destination location and transmit the one or more prices for the one or more routes, through the telecommunication channel, to the routing module; and
 wherein the routing module transmits, through the telecommunication channel, the one or more prices for the one or more routes to the autonomous vehicle.

9. The system of claim 8, wherein the input data comprises one of a form of transportation data, real time traffic data, speed of transport data, weather data, or toll data.

10. The system of claim 8, wherein the autonomous vehicle is an aerial vehicle.

11. The system of claim 8, wherein the system is capable of handling a payment transaction for one or more prices.

12. The system of claim 8, wherein the plurality of transportation spaces comprise curb space.

13. The system of claim 8, wherein the transportation spaces correspond to a set of three-dimensional spaces defined by one of two or more triplets of alpha numeric identifiers or a set of global positioning coordinates in combination with an altitude position value.

14. The system of claim 8, further comprising a settlement module configured to receive movement data from a movement module, wherein the settlement module is configured to confirm actual movement of the autonomous vehicle with the one or more routes.

15. A method for controlling transportation spaces comprising:
 submitting, through a telecommunication channel, from a planning module, to a routing module, a trip request comprising a starting location and a destination location, wherein the planning module is configured to receive the trip request from an autonomous vehicle;
 generating, using the routing module, a map of transportation spaces, each of the transportation spaces mapped in a three-dimensional coordinate system;
 transmitting, through the telecommunication channel, from a plurality of traffic sensors to the routing module and to a pricing module, data associated with real time traffic;
 generating, using the routing module, one or more routes to the destination location;
 calculating, using the pricing module, the data associated with real time traffic, the starting location, and the destination location, one or more prices for transport on the one or more routes;
 transmitting, through the telecommunication channel, to the routing module, from the pricing module, the one or more prices corresponding to the one or more routes;
 transmitting, through the telecommunication channel, to a settlement module, from a movement module, an actual movement of the autonomous vehicle;
 verifying the actual movement of the autonomous vehicle with the one or more routes using a settlement module; and
 handling a payment transaction for the one or more prices using the settlement module.

16. The method of claim 15, wherein the map of transportation spaces is divided into a set of three-dimensional spaces defined by one of two or more triplet of alpha numeric identifiers or a set of global positioning coordinates in combination with an altitude position value.

17. The method of claim 15, wherein the one or more routes includes one of a lowest cost route, a fastest route, or a shortest route.

18. The method of claim 15, wherein at least one traffic sensor of the plurality of traffic sensors is comprised in the autonomous vehicle.

19. The method of claim 15, further comprising receiving one or more restrictions at the routing module from a governance module.

20. The method of claim 15, wherein the autonomous vehicle is an aerial vehicle.

* * * * *